(12) United States Patent
Kitami et al.

(10) Patent No.: US 8,123,623 B2
(45) Date of Patent: Feb. 28, 2012

(54) SIMULATED GUN

(75) Inventors: Yoshinobu Kitami, Kobe (JP); Takashi Honda, Kobe (JP); Yuji Tamura, Akashi (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1301 days.

(21) Appl. No.: 10/592,852

(22) PCT Filed: Feb. 28, 2005

(86) PCT No.: PCT/JP2005/003320
§ 371 (c)(1),
(2), (4) Date: Sep. 13, 2006

(87) PCT Pub. No.: WO2005/088229
PCT Pub. Date: Sep. 22, 2005

(65) Prior Publication Data
US 2007/0184909 A1 Aug. 9, 2007

(30) Foreign Application Priority Data

Mar. 16, 2004 (JP) .................................. 2004-073719

(51) Int. Cl.
*A63F 13/04* (2006.01)
(52) U.S. Cl. .................. 463/51; 463/36; 434/18

(58) Field of Classification Search .................. 463/36, 463/37, 51–53; 434/16–19
See application file for complete search history.

(56) References Cited

U.S. PATENT DOCUMENTS
4,114,311 A * 9/1978 Chow ........................ 446/406
(Continued)

FOREIGN PATENT DOCUMENTS
EP 0 952 555 10/1999
(Continued)

*Primary Examiner* — Peter DungBa Vo
*Assistant Examiner* — Allen Chan
(74) *Attorney, Agent, or Firm* — Jordan and Hamburg LLP

(57) ABSTRACT

A simulated gun includes a main body and a reactionary force generator having a drive force generator, an actuator and a transmitter. The drive force generator is arranged outside the main body and transmits a drive force to a core constituting the transmitter by driving of the drive force generator. The rotational arm of the actuator is rotated together with a weight about the horizontal axis by a drive force from the core, and a drive force in a direction for raising the muzzle side of the gun is imparted to the main body when the weight hammers the inner wall surface of the main body. Consequently, a specified impact force can be generated by the drive force generator arranged outside of the main body, the size and weight of the main body can be reduced, and a realistic reaction force such that the muzzle side of the gun is sprung up can be realized.

10 Claims, 14 Drawing Sheets

U.S. PATENT DOCUMENTS

| | | |
|---|---|---|
| 4,302,190 A | 11/1981 | Shaw et al. |
| 4,480,999 A | 11/1984 | Witherell et al. |
| H186 H | 1/1987 | Marshall et al. |
| 5,569,085 A * | 10/1996 | Igarashi et al. ................ 463/49 |
| 6,019,681 A * | 2/2000 | Oishi et al. ..................... 463/49 |
| 6,088,021 A * | 7/2000 | Yong ............................. 345/163 |
| 6,328,650 B1 * | 12/2001 | Fukawa et al. ................. 463/36 |

FOREIGN PATENT DOCUMENTS

JP  2000-088494  3/2000

* cited by examiner

SIMULATED GUN

TECHNICAL FIELD

The present invention relates to a simulated gun capable of generating an impact reactionary force in accordance with a shooting performed in a shooting game and the like to make a player experience a feeling of real shooting.

BACKGROUND ART

Conventionally, there has been a known shooting game in which players compete to obtain scores by virtually shooting a target displayed on a display device. Generally, a game machine for performing such shooting game gives out a shooting sound in accordance with squeezing of a trigger by a player and displays on a screen of the display device a rendered image of a shooting result showing a state where a bullet virtually shot by a player hits or misses the target.

In recent years, there has been a tendency to request more realistic shooting game using a simulated gun. Accordingly, not only the shooting sound and the rendered image of the shooting result but also a simulated gun making a player to experience a reactionary force similar to the one generated when a real gun is shot is adapted. For example, a simulated gun provided with a reactionary force generator exists. The reactionary force generator is provided with an electromagnetic solenoid which moves a weight connected to an extremity of a plunger by an electromagnetic force in conjunction with a squeezing operation of the trigger and pivotally rotates the weight about a rotating shaft so as to make the weight collide with a contacting wall surface in the main body. Accordingly, a reactionary force is generated.

In a conventional simulated gun, numbers of coiling of an electromagnetic coil constituting the reactionary force generator and amount of weight needs to be increased to obtain a great impact force. Accordingly, size and weight of the simulated gun is increased, and operability of the simulated gun is caused to be lowered. On the other hand, in the case of decreasing size and weight, size and weight of the electromagnetic solenoid and the weight needs to be small. Accordingly, it becomes difficult to maintain an impact force generated by the weight at a required level.

DISCLOSURE OF THE INVENTION

A simulated gun according to the present invention was made to solve the problems described above. The simulated gun is capable of generating a reactionary force urging a muzzle of a barrel to move toward a side opposite to a trigger side with respect to the barrel following a virtual shooting in a shooting game and comprises: a main body; an actuator provided in a specified portion of the main body for generating a reactionary force urging the muzzle to move; a drive force generator arranged outside the main body; and a transmitter connecting the drive force generator and the actuator for transmitting a drive force generated in the drive force generator to the actuator.

According to the construction described above, a drive force generated in the drive force generator is transmitted to the actuator provided in the main body through the transmitter. When a drive force is transmitted to the actuator, the actuator imparts a force urging the muzzle of the barrel to move toward a side opposite to a trigger side with respect to the barrel (toward a direction raising the muzzle). Accordingly, a reactionary force in a virtual shooting is generated.

According to this, a size and weight of the main body can be reduced by arranging the drive force generator outside the main body, and a required great drive force can be generated in accordance with a power of the drive force generator. Consequently, a simulated gun capable of obtaining a rotation toward a direction of moving the muzzle of the barrel toward a side opposite to a trigger side with respect to the barrel, namely, capable of obtaining a realistic reactionary force springing up the muzzle side of the main body in a virtual shooting can be realized.

BEST MODE FOR CARRYING OUT THE INVENTION

Embodiment 1

Figure 1:
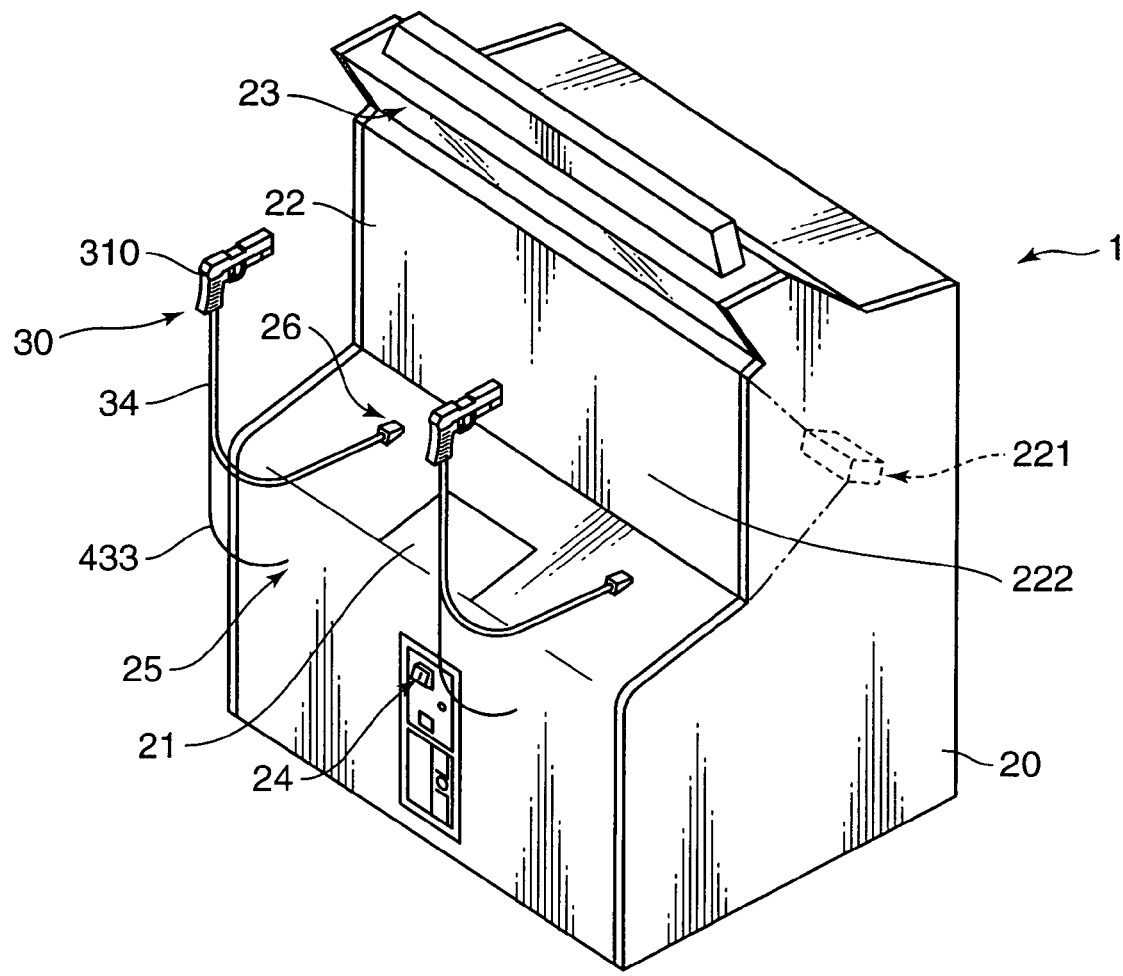
FIG. 1 is a view showing a schematic overall construction of a shooting game machine to which a simulated gun according to a first embodiment of the present invention is applied.

FIG. 1 is a view showing a schematic overall construction of a shooting game machine to which a simulated gun according to a first embodiment of the present invention is applied. In FIG. 1, a game machine 1 includes a casing 20 and required numbers of simulated guns 30 operably connected to the casing 20.

The casing 20 includes an operating section 21, a monitor section 22 and a speaker 23. The operating section 21 is provided in a central portion of a front face of the casing 20. The monitor section 22 is provided in an upper portion of the operating section 21 and is adapted for displaying a game image. The speaker 23 is provided in a top portion of the casing 20 and is adapted for producing a sound effect. Each simulated gun 30 is connected to the casing 20 through a signal cable 34 and a drive force transmitting cable 433 led out respectively from a specified portion of the operating section 21 and the casing 20. In an upper face of the operating section 21, various kinds of operating buttons including an unillustrated start button and the like are arranged. Further, the casing 20 includes a coin inserting opening 24 at a specified portion in a lower portion of the front face of the operating section 21. In an inner portion of the casing 20 corresponding to the place where the coin inserting opening 24 is positioned, a coin detecting portion (unillustrated) for detecting whether or not numbers of coins inserted to the coin inserting opening 24 satisfy required numbers for allowing a player to start the game.

The monitor section 22 is constructed by a known projector. Namely, the monitor section 22 includes a projecting portion 221 for optically outputting a game image and a screen 222 to which the game image outputted from the projecting portion 221 is projected. Further, a CRT, an LCD, a plasma display or an organic EL device and the like can be adapted to the projector section 22 in place of the projector.

Figure 2:
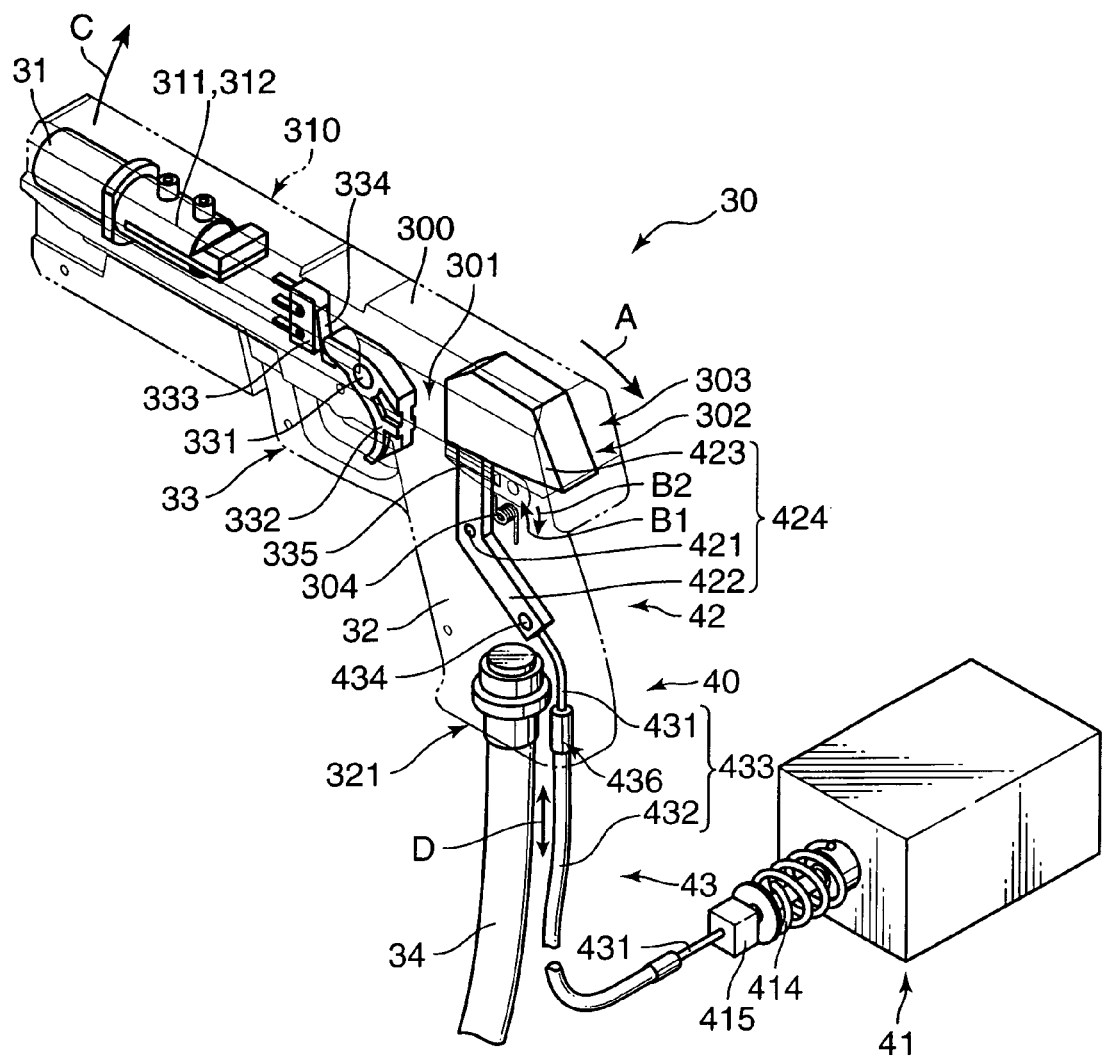
FIG. 2 is a perspective view showing an example of the simulated gun shown in FIG. 1.
Figure 3:
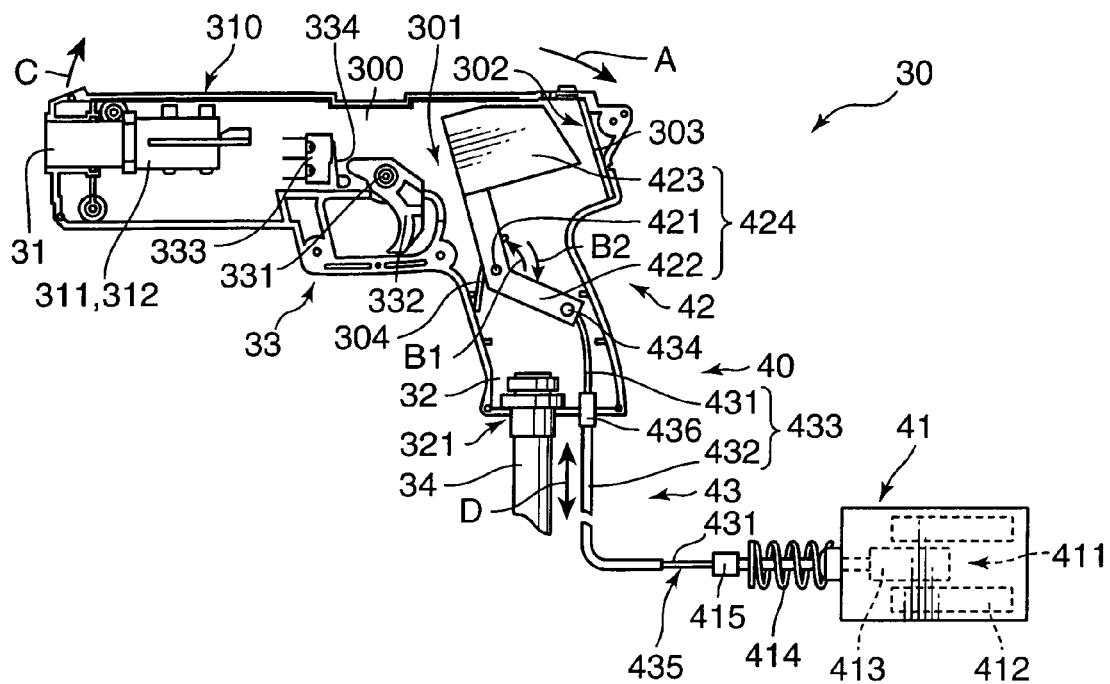
FIG. 3 is a side sectional view of the simulated gun shown in FIG. 2.

FIG. 2 is a perspective view showing an example of the simulated gun shown in FIG. 1. FIG. 3 is a side sectional view of the simulated gun shown in FIG. 2. As shown in FIGS. 2 and 3, the simulated gun 30 includes a main body 310 and a reactionary force generator 40. The main body 310 includes a long barrel portion 31, a handle portion 32 (grip) and a trigger portion 33. The handle portion 32 is provided at a rear side of the barrel portion 31 and is adapted for allowing a player to handle. The trigger portion 33 is provided in a front portion (muzzle side) of the handle portion 32. In a muzzle portion which is a front portion of the barrel portion 31, a light emitting device 311 and a light receiving device 312 are provided in a front portion along a direction of a barrel. The light emitting device 311 is adapted for irradiating an infrared beam light ray which is not affected by outside light. The light receiving device 312 is adapted for receiving an infrared light ray and functions as an image capturing section. An image capturing area of the light receiving device 312 includes a required field of view in a front side in a barrel direction. Further, a required space is formed in a rear portion of the barrel portion 31. An actuator 42 constituting a part of the reactionary force generator 40 described hereinafter is provided in the space.

The light receiving device 312 has a structure in which an infrared filter lays on a front face of an image capturing device and receives an infrared light ray irradiated from the light emitting device 311 and reflected from the screen 222. Although it is unillustrated in figures, the light receiving device 312 captures a spot of an image of infrared light rays irradiated from one or preferably two infrared light ray emitting devices arranged at reference positions set in advance on the screen 222 to determine a position of the screen 222. A main controller 100, which will be described hereinafter, provided in the casing 20 calculates a directional position of a muzzle geometrically according to a position (positional information) of a light spot, including light spots for determining a position, received in the light receiving device 312 so that a direction of the muzzle and a virtual impact position on the screen are calculated. Accordingly, a ballistic trajectory in a game image can be calculated, and whether or not a bullet is virtually hit can be displayed. Various kinds of methods for detecting a directional position and direction of the muzzle on the screen 222 can be adapted. Especially, it may be so constructed that capturing of a light ray from the main body 310 is performed by arranging a camera functioning as an image capturing portion in a side of the casing 20 and in a front side or back side of the screen so as to make the translucent screen 222 a field of view.

In the handle portion 32, a required space is formed, and the actuator 42 is provided in the space. Further, in a specified portion of a surface of the handle portion 32, for example, in a bottom portion 321, receiving portions for leading the signal cable 34 and the drive force transmitting cable 433 are formed.

The trigger portion 33 includes a trigger (a firing lever) 332 and a trigger switch 333. The trigger 332 is axially supported by a horizontal shaft 331 and is rotatable about an axis of the horizontal shaft 331. The trigger switch 333 is provided in a vicinity of the trigger 332. The trigger switch 333 includes a movable piece 334 coming in contact with a part of the trigger 332 and changing orientation at the time when a (backward) squeezing operation is performed. Switching of ON and OFF states is made by the changing of positional orientation of the movable piece 334. For the trigger switch 333, other than the mechanical switching in accordance with a contact, an optical sensor such as a photo-interrupter may be used. Further, though it is not illustrated in figures, a biasing member such as a coil spring for imparting a biasing force to move the trigger back to an initial position at front side of the trigger 332 (refer to FIG. 3) is attached to the horizontal shaft 331.

Further, in a specified outer portion of the main body 310, which is an upper position of the handle portion 32 (a rear side position of the barrel portion 31), a sliding switch 335 being manually operable to switch a mode to a single shooting mode and a successive shooting mode (a shooting mode of what is called a machine gun shooting) is provided. Other than the sliding type, a pushing type may be employed for the switch 335.

The reactionary force generator 40 includes a drive force generator 41, an actuator 42 and a transmitter 43. The drive force generator 41 is arranged at least at a specified portion other than the main body 310. In the present embodiment, the drive force generator 41 is arranged in the casing 20. The actuator 42 is provided in the main body 310 and is adapted for actuating a drive force. The transmitter 43 is adapted for transmitting a drive force generated in the drive force generator 41 to the actuator 42.

The drive force generator 41 includes an electromagnetic solenoid 411 and a spring 414. The electromagnetic solenoid 411 includes a coiled electromagnetic coil portion 412 and a plunger 413 moving back and forth in an axial direction in a center of the coiled portion in accordance with supply and suspension of a magnetic force. The spring 414 (e.g. a coil-like spring member) is adapted for imparting a biasing force to the plunger 413 to urge the plunger 413 in an outward direction from the casing of the electromagnetic solenoid 411. In the electromagnetic solenoid 411, the plunger 413 moves in an inserting direction with respect to a casing of the electromagnetic solenoid 411 when a magnetic force is generated in accordance with supply of a drive current is supplied from an unillustrated power source to the electromagnetic coil 412. When a driving current is suspended and a magnetic force is eliminated, the plunger 413 projects in an outward direction due to a biasing force applied by the spring 414. A stroke of movement of the plunger 413 is set to be a predetermined length. In an end edge portion of the plunger 412, a tubular collar body 415 is provided.

Consequently, since the drive force generator 41 includes the electromagnetic solenoid 411 and the spring 414, the drive force generator 41 for imparting a drive force to apply a reactionary force to the main body 310 can be realized with more simple construction. It should be noted that an item for applying a biasing force to urge the plunger 413 to project in an outward direction from the electromagnetic solenoid 411 is not limited to the spring 414. It may be, for example, a plate-like spring body. Further, the drive force generator 41 is not limited to the one employing the electromagnetic solenoid 411. Any drive force generator transmittably generating a mechanical drive (movement) i.e. the one using a motor may be employed.

The actuator 42 is provided in a specified portion of the main body 310, preferably in a space formed in an inner portion of the barrel portion 31 or in a space formed in the handle portion 32, or in a space formed extendingly across an inner portion of the barrel portion 31 and the handle portion 32. In the present embodiment, the actuator 42 is provided in a space formed extendingly in an inner portion of the barrel portion 31 and the handle portion 32.

The actuator 42 includes a hitting portion 424 having a horizontal shaft 421, a rotational arm 422 and a weight 423. The horizontal shaft 421 is provided in an approximately central portion in a space 300. The rotational arm 422 has a required length and is axially supported at an intermediate position of the horizontal shaft 421 i.e. at an approximately central position. The weight 423 is fixedly provided in an end side (upper end side in FIG. 3) of the rotational arm 422. The hitting portion 424 is so constructed to be movable between a separating position from and a contacting position with the inner wall surface of the main body. Namely, the hitting portion 424 is supported rotatably about the horizontal shaft 421 between an open position 301 and a contacting position 302. The contacting position 302 is a position in a direction indicated by an arrow A with respect to the open position 301 and coming in contact with a rear end inner wall of the barrel portion 31. The weight 423 is a weight having a predetermined shape and a predetermined weight for hitting a rear end inner wall of the barrel portion 31 so as to impart an impact thereto. In the present embodiment, the weight is formed to be a shape of an approximate cuboid. One face portion of the weight 423 comes in contact with a rear end inner wall of the barrel portion 31 and imparts a required impact force to a rear portion of the barrel portion 31.

At least on one side of the rear end inner wall of the barrel portion 31 and the contacting surface of the weight 423, a sound insulating member 303 is provided so as to insulate a sound. In the present embodiment, the sound insulating member 303 is provided in a rear end inner wall of the barrel portion 31. Further, in the horizontal shaft 421, a biasing member for imparting a biasing force in a rotational direction toward a front side (a side of the muzzle portion) indicated by an arrow B1 with respect to the rotational arm 422 (weight 423) is provided. In the present embodiment, a coil spring 304 is provided. Further, in a base end portion of the rotational arm 422, the transmitter 43 described hereinafter is connected.

Consequently, since the actuator 42, specifically an impact position of the weight 423 with respect to the inner wall and a direction of imparting an impact, is set toward a tangential direction within a counter-clockwise direction with respect to an approximate central position of the handle portion 32, at a specified position in the barrel portion 31 in the present invention, and in a direction of facing backward, the main body 310 receives a force (a reactionary force in the present embodiment) urging a muzzle of the barrel portion 31 to move toward a side opposite to a side of a trigger 332 (trigger portion 33) with respect to the barrel portion 31 at the time when an impact is imparted. For example, in the case shown in FIG. 2, the main body 310 receives a force (reactionary force) of rotating an approximately central position of the handle portion 32 in a direction (a direction indicated by an arrow C) of raising a side of the muzzle portion. Further, the actuator 42 is set to face backward at a specified position of the barrel portion 31 as described above. Accordingly, the actuator 42 (hitting portion 424) is not provided in an outer face portion but in an inner portion so that the main body 310 which is good in operability and has a good appearance can be obtained.

The transmitter 43 connects the drive force generator 41 and the actuator 42 for transmitting a drive force generated in the drive force generator 41 to the actuator 42. The transmitter 43 includes a drive force transmitting cable 433 having a core 431 and an outer member 432. The core 431 is a slender line member having elasticity (flexibility). In the present embodiment, a wire is used for the core 431. A leading end of the core 431 is connected to a lower end of the rotational arm 422 at a connecting position 434. A base end 435 of the core 431 is placed in a collar body and connected to the plunger 413.

The outer member 432 is formed to be tubular (cylindrical) and has elasticity (flexibility). The outer member 432 is a so-called protecting cable (wire protecting cable) freely enclosing the core 431 in the tube adapted for guiding (curving) the core 431 in a voluntary direction and protecting the core 431 from disruption of forward and backward movement due to a contact with exteriorly provided stuffs (for example, the casing 20 and a hand of a player handling the main body 310). A leading end 436 of the outer member 432 is fixed to a bottom face portion 321 of the handle portion 32 and is restricted from moving in a longitudinal direction with respect to the main body 310 indicated by an arrow D.

As described above, the outer member 432 of the transmitter 43 is fixed to the main body 310 while being restricted from moving with respect to the main body 310, and the core 431 is enclosed (freely enclosed) in the outer member 432 while being freely movable. Further, a drive force generated in the drive force generator 41 is imparted to the base end portion 435 of the core 431 so that the core 431 is moved (moved in forward and backward directions) a predetermined distance, namely, a distance of movement in a direction toward which the plunger 413 moves to project outwardly (or in an insertion direction). Accordingly, a drive force (movement) is transmitted to the actuator 42.

Consequently, since the transmitter 43 (a drive force transmitting cable 433) includes the core 431 and the outer member 432 and the core 431 is moved with respect to the outer member 432 to perform a drive force transmission, a construction to a drive force generated in the drive force generator 41 to the transmitter 43 and the actuator 42 can be realized with a simple construction. Further, since a moving passage of the core 431 is fixed by the outer member 432 enclosing the core 431, when the base end portion 435 of the core 431 is pulled by the drive force generator 41, the state where only a slack (loosening) in an intermediate portion of the core 431 is stretched and a drive force is not transmitted from the stretched position can be prevented. Concerning the loosened portion, a shape of the loosened portion of the core 431 is retained by the outer member so that a drive force is assuredly transmitted from the loosened position to the tip portion, namely, transmitted to the main body 30. Further, since the core 431 is long and slender, a drive force generated in the drive force generator 41 is transmitted to the main body 310 which is oriented toward a desirable direction at a position apart from the drive force generator 41. Further, following that a drive force is directly transmitted to the main body 30 by the slender core 431, various reactionary movements, namely a single shooting or successive shooting and a strength of a reactionary force following to a shooting can be accurately reflected to the main body.

Further, as shown in FIG. 1, the drive force transmitting cable 433 may be led into the casing 20 from a leading position 25 positioned in a front side face of the casing 20 or may be led into from the leading position 26 positioned at the base end side of the signal cable 34 described hereinafter.

The drive force transmitting cable 433 and the signal cable 34 are connected to specified outer portions (outer surface) of the main body 310, the bottom face portion 321 (receiving portion) of the handle portion 32 in the present embodiment. Though it is not indicated in figures, the signal cable 34 extends from a position of the bottom face portion 321 to the light emitting device 311, the light receiving device 312, the trigger switch 333 and the switch 335 for selecting a game mode. The signal cable 34 consists of a bundle of required signal lines for a power source of the light emitting device 311, a power source of the light receiving device 312 and a signal line for transmitting and controlling an imaging signal, and further a signal line for transmitting a signal for switching of the trigger switch 333 and the switch 335.

Specifically, the signal cable 34 is placed in a freely bendable so-called harness (accordion) formed to be a tubular shape. In an outer surface of the harness, a protecting member (protecting tube) made of a rubber member, for example, is placed. The signal cable 34 is led into an inner portion of the casing 20 at the leading position 26 provided in a front face side, for example, of the casing 20 and freely movably supports the main body 310 by the harness being fixed to the base end portion of the casing 20. Further, the signal cable 34 functions to prevent the main body 310 from being stolen.

As described above, a drive force generated in the drive force generator 41 arranged outside the main body 310 is applied to the base end portion 435 of the core 431. Accordingly, the core 431 is moved a predetermined distance in a longitudinal direction with respect to the outer member 432 so that a drive force according to this mechanical movement is transmitted to the rotational arm 422 of the hitting portion 424. The hitting portion 424 receives a drive force transmitted from the rotational arm 422 and moves to collide with a contact position 302 of the inner wall of the main body from the separating position 301 in the main body 310. Accordingly, an impact force toward a direction of raising the muzzle portion with respect to the main body 310 is imparted. Accordingly, a reactionary force following a virtual shooting is generated.

Figure 4:
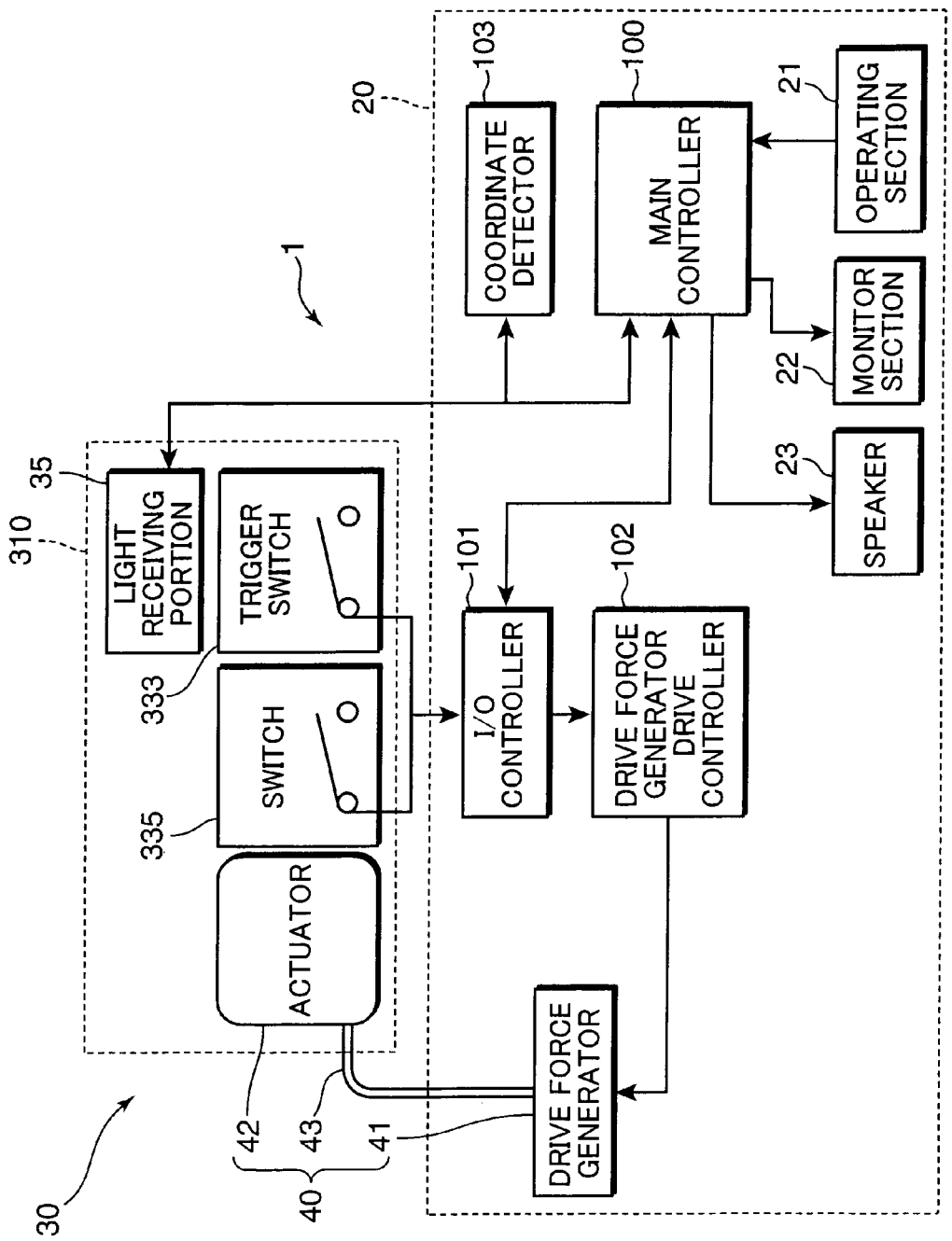
FIG. 4 is a block diagram mainly showing a control system relating to a shooting operation of the simulated gun of the shooting game machine shown in FIG. 1.

FIG. 4 is a block diagram showing mainly a control system relating to a shooting operation of the simulated gun of the shooting game machine shown in FIG. 1. As shown in FIG. 4, in the shooting game machine 1, the main body 310 includes the actuator 42, the trigger switch 333, the switch 335 and a light receiving portion 35 having the light emitting device 311 and the light receiving device 312. The casing 20 includes the operating section 21, the monitor section 22, the speaker 23 and the drive force generator 41. Further, the casing 20 includes a main controller 100, an I/O controller 101, a drive force generator drive controller 102 and a coordinate detecting section 103.

The I/O controller 101 includes a CPU and is adapted for controlling inputs of signal data transmitted from the trigger switch 333, the switch 335 and the main controller 100 and outputs of signal data transmitted to the drive force generator drive controller 102 and the main controller 100. (input and output control) The I/O controller 101 may include a photo-coupler adapted for performing an optical signal transmission between the drive force generator drive controller 102 and the I/O controller 101. In this case, since the drive force generator drive controller 102 is a 5V to 12V control and the I/O controller 101 is a 100V control, the photo-coupler performs an optical signal transmission in accordance with difference of control voltage therebetween.

The drive force generator drive controller 102 performs a drive control of the drive force generator 41 based on an input signal from the trigger switch 333, the switch 335 and the main controller 100.

The coordinate detector 103 calculates a directional position of the muzzle of the main body 310 geometrically based on an image data transmitted from the light receiving portion 35, namely, based on positional information of a light spot of an infrared light ray irradiated from the light emitting device 311 and reflected in the screen 222 and of a light spot of an infrared light ray from an infrared light ray emitting device arranged at a basic position of the screen 222 received in the light receiving device 312 to calculate a direction of the muzzle and a virtual impact position (positional coordinate) in the screen. The coordinate detector 103 may be the one calculating at least a positional coordinate of an impact position.

Each devices such as the operating portion 21, the monitor section 22, the speaker 22, the I/O controller 101, the coordinate detector 103 and the light receiving portion 35 are connected to the main controller 100. The main controller 100 includes a ROM for storing a game image, a game program, sound data such as a sound effect and other various kinds of data required for processing the game, a RAM for temporarily storing data under processing and a timer and the like and is adapted for controlling a whole game machine in correspondence with an operation instruction inputted from the operating section 21 and a detecting signal transmitted from respective sensors provided in various portions of the shooting game machine 1. The above-described game image is a 2D image and a 3D image and indicates a background image, an enemy character and other respective kinds of objects (for example, objects for displaying a proximal impact rendering an impact at the time when the shooting is missed).

When the trigger switch 333 of the main body 310 is turned on, (in this case, a single shooting mode is selected in the switch 335) the ON signal (described as a trigger signal hereinafter) is inputted to the main controller 100 through the I/O controller 101. The main controller 100 drives the light emitting device 331 of the main body 310 based on the trigger signal to irradiate an infrared light ray and outputs an operation signal to the drive force generator drive controller 102 through the I/O controller 101 make the drive force generator 41 drive. Then, the driving of the drive force generator 41 is performed by the drive force generator drive controller 102 based on the operational signal. Namely, a pulse electric current is supplied to the electromagnetic solenoid 411 to make the plunger 413 move in an inserting direction once and pull the core 431 of the transmitter 43 once.

When the switch 335 is switched and the successive shooting mode is selected, this signal is inputted to the main controller 100 through the I/O controller, and data indicating that the successive shooting mode is selected is stored in the RAM. When the successive shooting mode is selected, the main controller 100 makes the drive force generator 41 drive in a predetermined time interval (the predetermined time interval is measured by the timer) through the drive force generator drive controller 102 during when the trigger switch 333 is turned on. Namely, a pulse electric current is supplied to the electromagnetic coil portion 412 in a predetermined time interval to make the plunger 413 move forward and backward successively and pull the core 431 continuously. Accordingly, the form of machine gun shooting is realized.

Further, the main controller 100 receives a signal from a coin detector indicating that numbers of coins required for allowing starting of the game are inserted to the coin inserting opening 24, a signal indicating the start of the game inputted by pressing the start button in the operating portion 21 and various kinds of input signals from the main body 310. Then, in accordance with a game program and the like stored in the ROM, the main controller 100 controls the monitor section 22 to display a game image and controls the speaker 23 to output various kinds of sound effect such as an impact (hitting and missing) sound and a sound effect at the time of impact in proximity. Furthermore, when another player newly inserts coins to join the shooting game and presses the start button so that a signal is inputted, the main controller 100 controls the main body 310 corresponding to the start button to be operable and enables the player to join the game.

Figure 5:
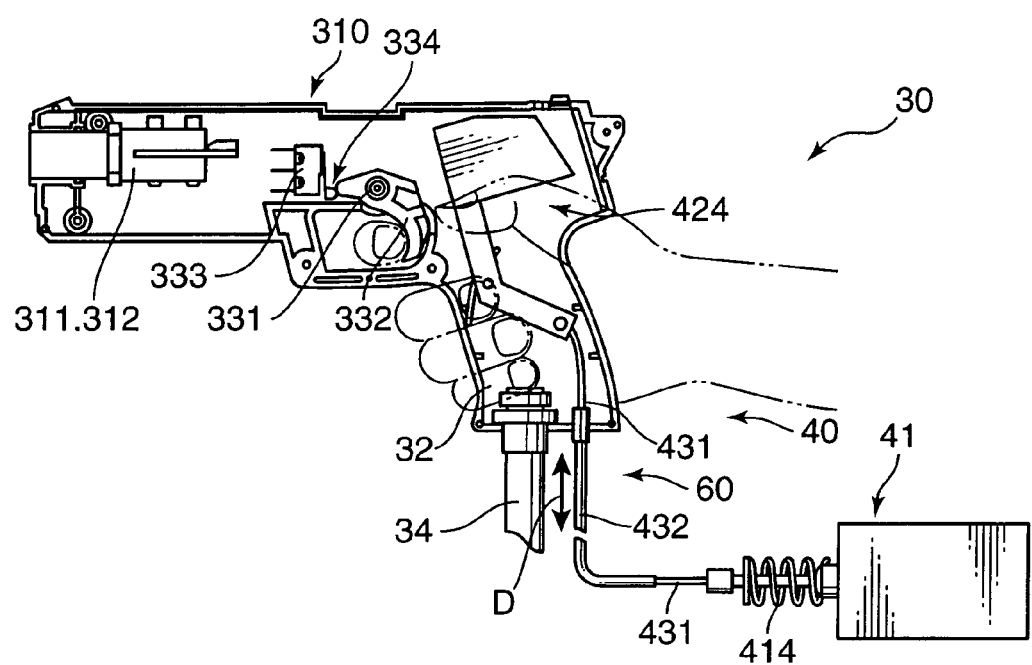
FIG. 5 is a view for describing a movement of an internal structure at the time when the main body of the simulated gun is handled by a player and a trigger thereof is squeezed.
Figure 6:
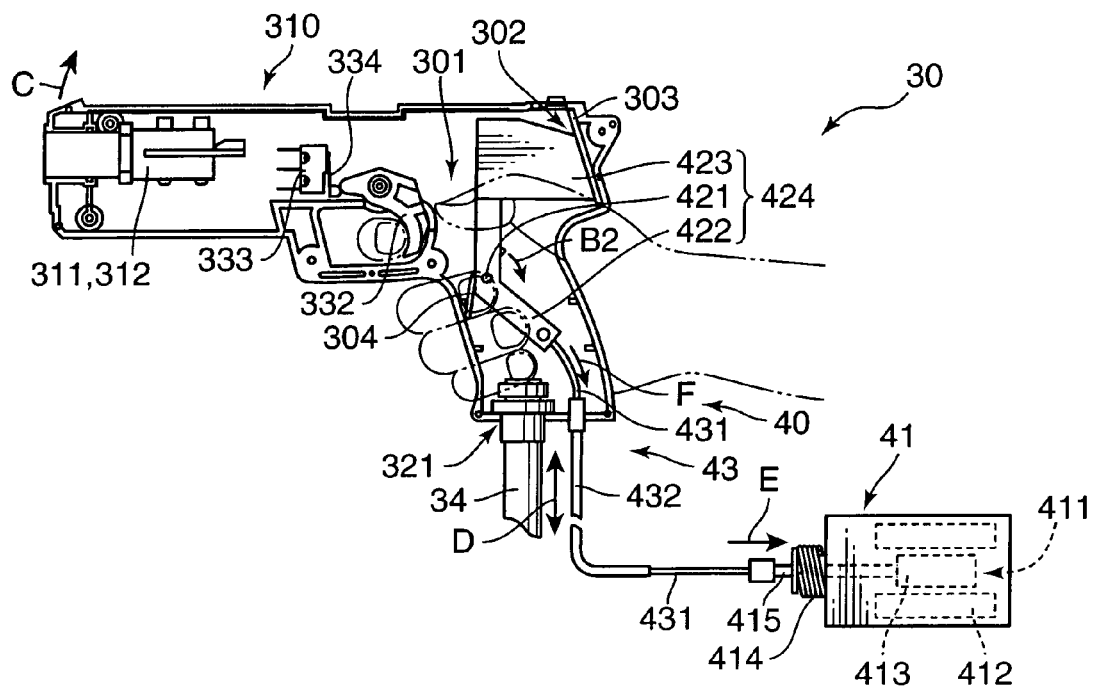
FIG. 6 is a view for describing a movement of an internal structure at the time when the hitting portion comes in contact with an inner wall surface of the main body of the simulated gun.
Figure 7:
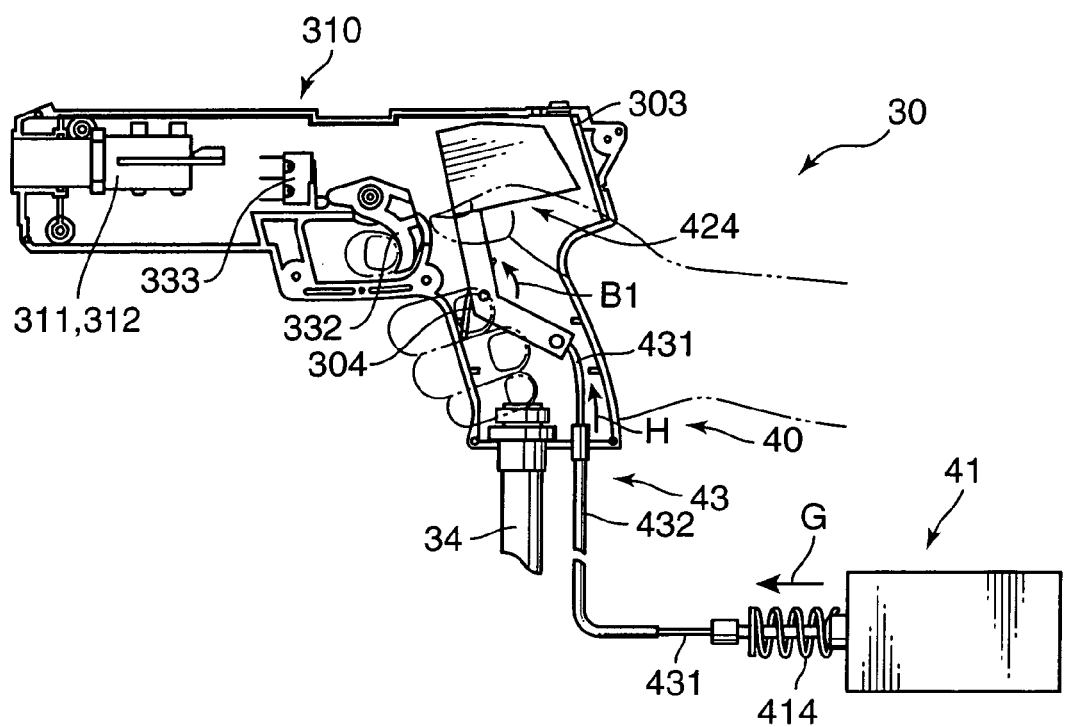
FIG. 7 is a view for describing a movement of an internal structure at the time when the hitting portion moves toward an initial position.
Figure 8:
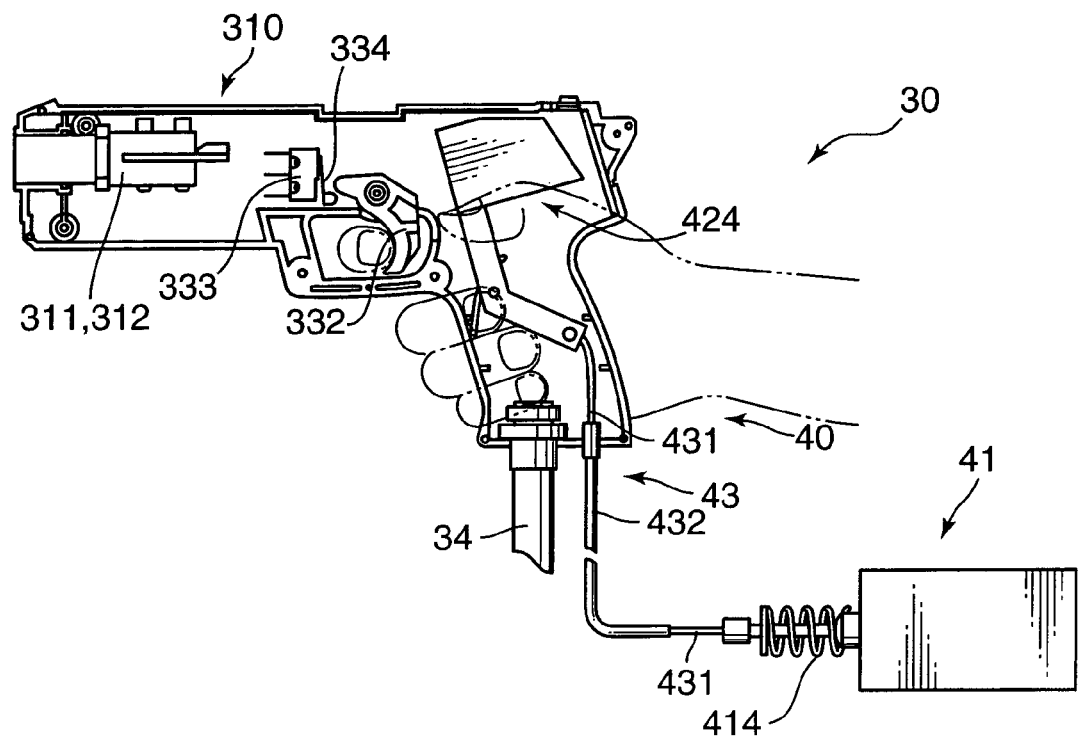
FIG. 8 is a view for describing a movement of an internal structure at the time when a trigger is moved back to an initial position from the state of being squeezed.

Next, a shooting operation of the main body 310 is described with reference to the FIGS. 3, 4 and 5-8. FIG. 5 is a view for describing a movement of an internal structure at the time when the main body 310 is handled by a player and the trigger 332 is squeezed. FIG. 6 is a view for describing a movement of an internal structure at the time when the hitting portion 424 comes in contact with an inner wall surface of the main body 310. FIG. 7 is a view for describing a movement of an internal structure at the time when the hitting portion 424 moves back to an initial position. FIG. 8 is a view for describing a movement of an internal structure at the time when a trigger has been moved back to an initial position from the state of being squeezed.

Assuming that the single shooting mode is selected in the switch 335, when the trigger 332 is squeezed as shown in FIG. 5 and rotated about the horizontal shaft 331 as a supporting point, a leading end of the trigger 332 comes in contact with the movable piece 334 of the trigger switch 333 to change a posture (press downward) of the movable piece 334. Accordingly, the trigger switch 333 is turned on. When the trigger switch 333 is turned on, a trigger signal is inputted to the main controller 100 through the signal cable 34. Based on this input, the main controller loo outputs an operational signal to make the drive force generator drive controller 102 control the drive force generator 41 to drive.

Then, as shown in FIG. 6, by a control of the drive force generator drive controller 102, a pulse electric current is supplied to the electromagnetic coil portion 412 of the drive force generator 41. Accordingly, the plunger 413 moves in an inserting direction toward the casing of the electromagnetic solenoid 411 while resisting against the biasing force generated by the spring 414 so that the core 431 moves a predetermined distance in a direction indicated by an arrow E with respect to the outer member 432. Accordingly, the hitting portion 424 connected to the core 431 is pulled a predetermined distance in a direction indicated by an arrow F. Then, the hitting portion 424 is rotated in a direction indicated by an arrow B2 about the horizontal shaft 421 as a supporting point while resisting against a biasing force generated by the coil spring 304, namely, the weight 423 receives a drive force generated in the drive force generator 41 and is rotationally moved from the separating position 301 to the contacting position 302, and collides with the sound insulating member 303. A force generated by the collision urging the main body 310 to move backward is imparted to the main body as an impact reactionary force toward a direction raising the muzzle portion in a direction indicated by the arrow C with respect to an approximately central position of the handle portion 32 (corresponding to an unillustrated central position of the portion of the main body 310 gripped by a player).

Next, when a supply of a pulse electric current to the electromagnetic coil portion 412 is terminated in FIG. 6, as shown in FIG. 7, the plunger 413 is moved in a projecting direction due to a biasing force generated by the spring 414 and the core 431 moves reversely a predetermined distance (moves back to an initial position) in a direction indicated by the arrow G with respect to the outer member 432. Consequently, the hitting portion 424 is moved back in a direction indicated by an arrow H due to a biasing force generated by the coil spring 304.

Next, as shown in FIG. 8, weakening of a force of squeezing the trigger 332 applied by a player and a biasing force applied to the trigger 332 make the trigger be rotationally moved back to the initial position shown in FIG. 3. Accordingly, the contact with respect to the movable piece 334 is released and the trigger switch 333 is turned off. The operation shown in FIGS. 5-8 and FIG. 3 is repeated each time of shooting (squeezing a trigger).

In the case where the successive shooting mode is selected in the switch 335, during when the trigger switch 333 is turned on after the trigger 332 is squeezed, a periodical supply of a pulse electric current is repeated. Consequently, a rotation of the hitting portion 424 in a direction indicated by the arrow B2, a collision of the weight to the sound insulating member 303 and a rotation in a direction indicated by an arrow B1 is performed repeatedly so that an impact is applied to the main body 310 successively. Accordingly, an impact reactionary force (a reactionary force of the machine gun shooting) is imparted successively to the main body 310.

Embodiment 2

Figure 9:
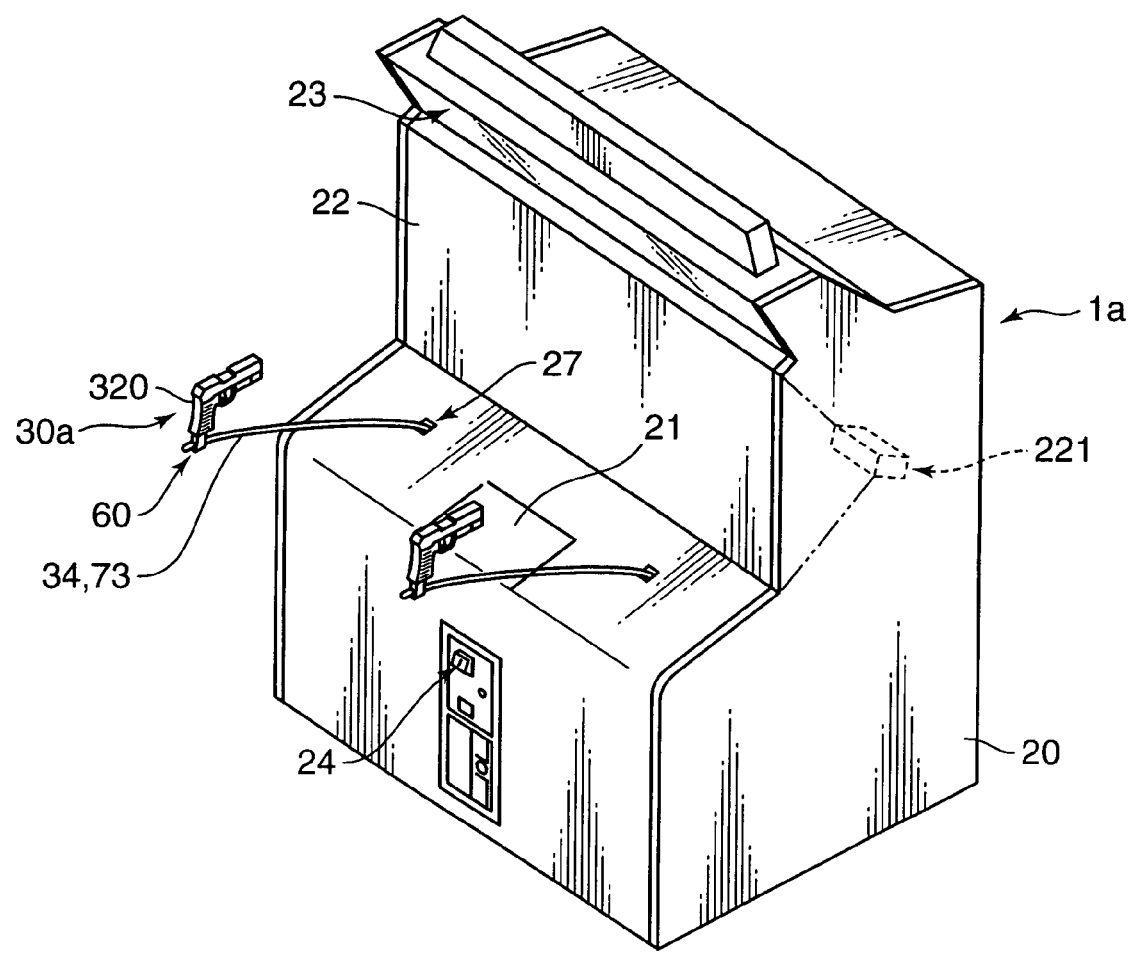
FIG. 9 is a view showing a schematic construction of the shooting game machine in the case where a simulated gun according to a second embodiment of the present invention is applied to the shooting game machine.

FIGS. 9 to 14 are views of the case where a simulated gun (simulated gun 30*a*) according to a second embodiment of the present invention is applied to the shooting game machine. It should be noted that a construction which is given the same reference numeral in the figure indicates that it has the same construction. At first, FIG. 9 is a view showing an overall schematic construction of a shooting game machine. A shooting game machine 1*a* shown in FIG. 9 and the shooting game machine 1 shown in FIG. 1 are different in constructions of a simulated gun 30*a* in a main body 320 and a portion connecting the main body 320 and the casing 20. Namely, they are different in constructions of the actuator 60 and the transmitter 70 and of a supporting mechanism of the main body by the signal cable 34. Constructions of these are described herebelow. However, since other constructions are the same as that of the shooting game machine 1 shown in FIG. 1, the description thereof is abbreviated.

Figure 10:
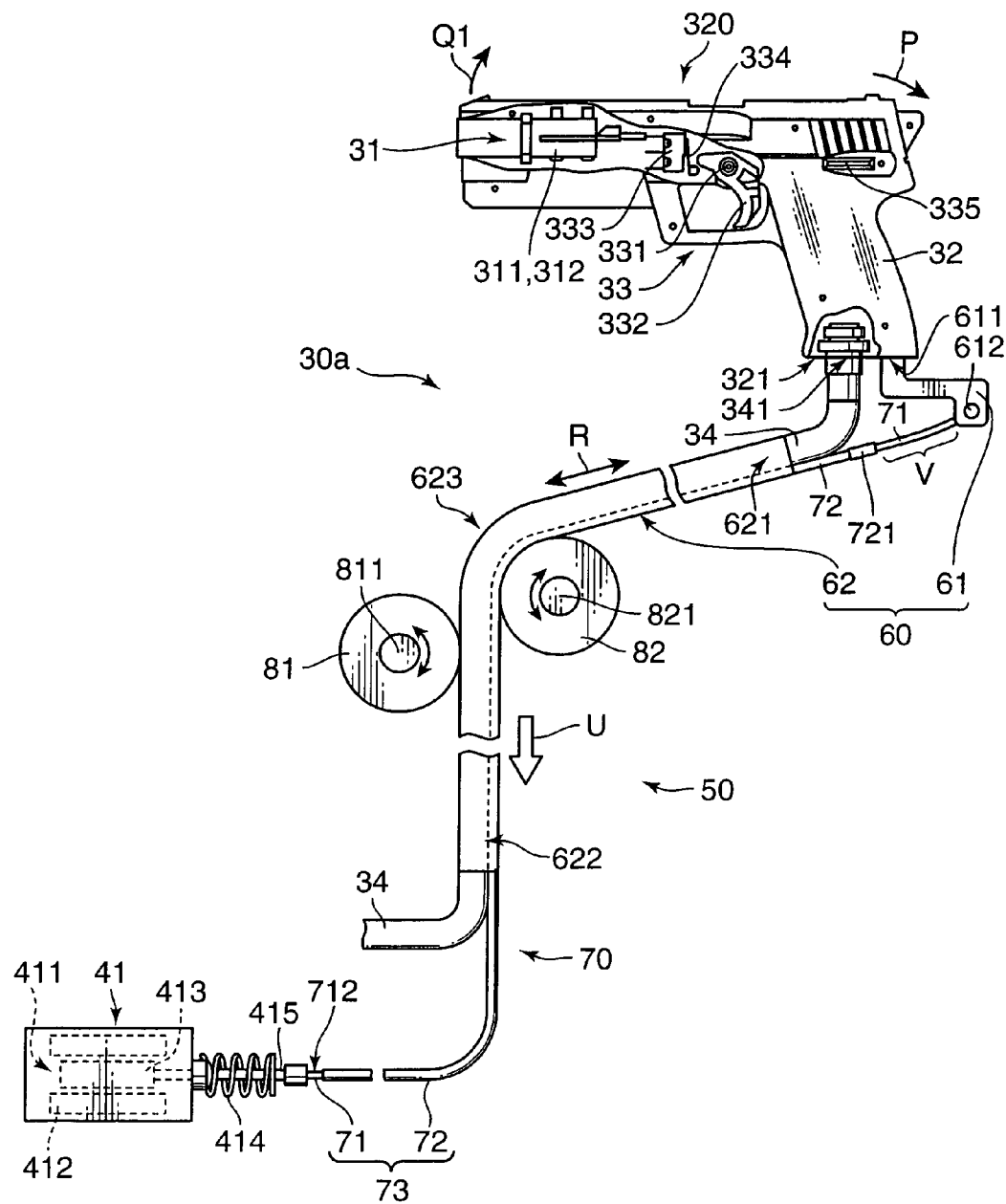
FIG. 10 is a perspective view showing an example of the simulated gun shown in FIG. 9.

FIG. 10 is a perspective view showing an example of the simulated gun shown in FIG. 9 (including a partial sectional view of the main body 320). As shown in FIG. 10, the main body 320, like the main body 310 shown in FIGS. 2 and 3, has a general construction of a hand gun including a muzzle portion 31, a handle portion 32 and a trigger portion 33. A reactionary force generator 50 is applied to the main body 320. The reactionary force generator 50 includes a drive force generator 41 arranged in the casing 20, an actuator 60 for actuating a drive force and a transmitter 70 for transmitting a drive force generated in the drive force generator 41 to the actuator 60.

The transmitter 70 connects the drive force generator 41 and the actuator 60 for transmitting a drive force generated in the drive force generator 41 to the actuator 60. The transmitter 70 is constructed by a drive force transmitting cable 73 including a core 71 and an outer member 72 both having the identical construction as that of the core 431 and the outer member 432 shown in FIGS. 2 and 3. However, being different from the outer member 432, a leading end 721 of the outer member 721 is not fixed in a bottom face portion of the handle 32. Further, being different from the core 431, a leading end of the core 71 is connected to a connecting member 61 described hereinafter attached at an outer portion of the handle portion 32.

The actuator 60 includes a connecting member 61 and a retaining member 62. The connecting member 61 is adapted for connecting the transmitter 70 and the main body 320. The connecting member 61 is formed to have an approximate L-shape in a side view and has a base end (attaching portion 611) fixedly provided in a bottom face portion 321 of the handle portion 32 and a leading end provided extendingly in a backward direction. The connecting member 61 has in its leading end a connecting portion 612 to be connected with a leading end of the core 71. In short, the connecting portion 612 is arranged at a position having a positional relationship where it connects the transmitter 70 and the main body 320 at a specified outer portion of the main body 320 and at a position further apart from the muzzle than the connecting portion 341 of the signal cable 34 and capable of imparting a rotational force in a clockwise direction (a direction lifting up the muzzle) indicated by an arrow P in figure when the connecting portion 612 is pulled with respect to the position of the bottom portion 321. The connecting member 61 may be formed integrally with the handle portion 32.

As described above, since the attaching portion 611 of the connecting member 61 and the connecting portion 341 of the signal cable 34 is are located at a bottom end (herein, the bottom face portion 321) of the handle portion 32, it would not be necessary to provide areas exclusively used for connecting the signal cable 34 and for attaching the connecting member 61 in the main body 320 so that the main body 320 may have an appearance which is close to a real gun.

The retaining member 62 is adapted for substantially unifying the outer member 72 and the signal gable 34. The retaining member 62 has elasticity (flexibility) and has a tubular shape extending from an upper end position 621 of the retaining member 62 to a lower end position 622 thereof. The signal cable 34 and the outer member 71 enclosing the core 71 are placed together in the tube and are unified to be fixed so as to prevent a relative movement with respect to each other in a longitudinal direction. In the case of using this fixing, the signal cable 34 and the outer member 72 (core 71) are arranged such that a leading end portion of the signal cable 34 is bent toward the bottom face portion 321 of the handle portion 32 at its upper end position 621 being a diverging point and a leading end portion of the outer member 72 (core 71) extends linearly toward the connecting portion 612 with respect to the connecting member 61. The outer member 72 and the signal cable 34 do not have to be unified in a whole length. The outer member 72 and the signal cable 34 but may be unified at least at a vicinity of a leading end of the signal cable 34 (a vicinity of one end at the side of the main body 310.

Consequently, since the outer member 72 is fixed to the signal cable 34 by the retaining member 62 with the signal cable 34 in such a manner as to unify them, a movement in a longitudinal direction indicated by an arrow R with respect to the main body 320 is restricted. Further, since drive force generated in the drive force generator 41 is imparted to the base end 712 of the core 71 in this state, the core 71 becomes movable a predetermined distance in a longitudinal direction with respect to the outer member 71. Furthermore, the state of connecting the core 71 to the connecting member 61 without loosening can be easily obtained. Accordingly, a drive force generated in the drive force generator 41 can be assuredly transmitted to the main body 320 through the core 71. Further, since the outer member 72 is unified with respect to the signal cable 34, a shape of the outer member 72 at the time when the core 71 moves can be made strong and assured.

The signal cable 34 and the outer member 72 unified by the retaining member 62 (hereinafter, the cable formed by unifying the signal cable 34 and the outer member 72 with the retaining member 62 is recited as a unified cable) guided by a pair of rollers 81, 82 at a midstream position 623 between the main body 320 and the drive force generator 41. The unified cable is movably nipped by the rollers 81, 82 and retained. Each of the rollers 81, 82 has opposite ends in a direction of a rotational axis formed to have a wider width than that of intermediate (central) portion so that the unified cable nipped between the rollers is unlikely to be displaced. The rollers 81, 82 are provided in a position lower than the main body 320 in use for play and in a forward area of the handle portion 32 of the main body 320 in a direction facing the muzzle. Specifically, the rollers 81, 82 are rotatably supported by supporting shafts 811, 821 arranged parallel to and a predetermined distance apart from a floor surface in a lower portion of the casing 20 of the shooting game machine 1a at a leading opening 27 shown in FIG. 9.

Figure 11:
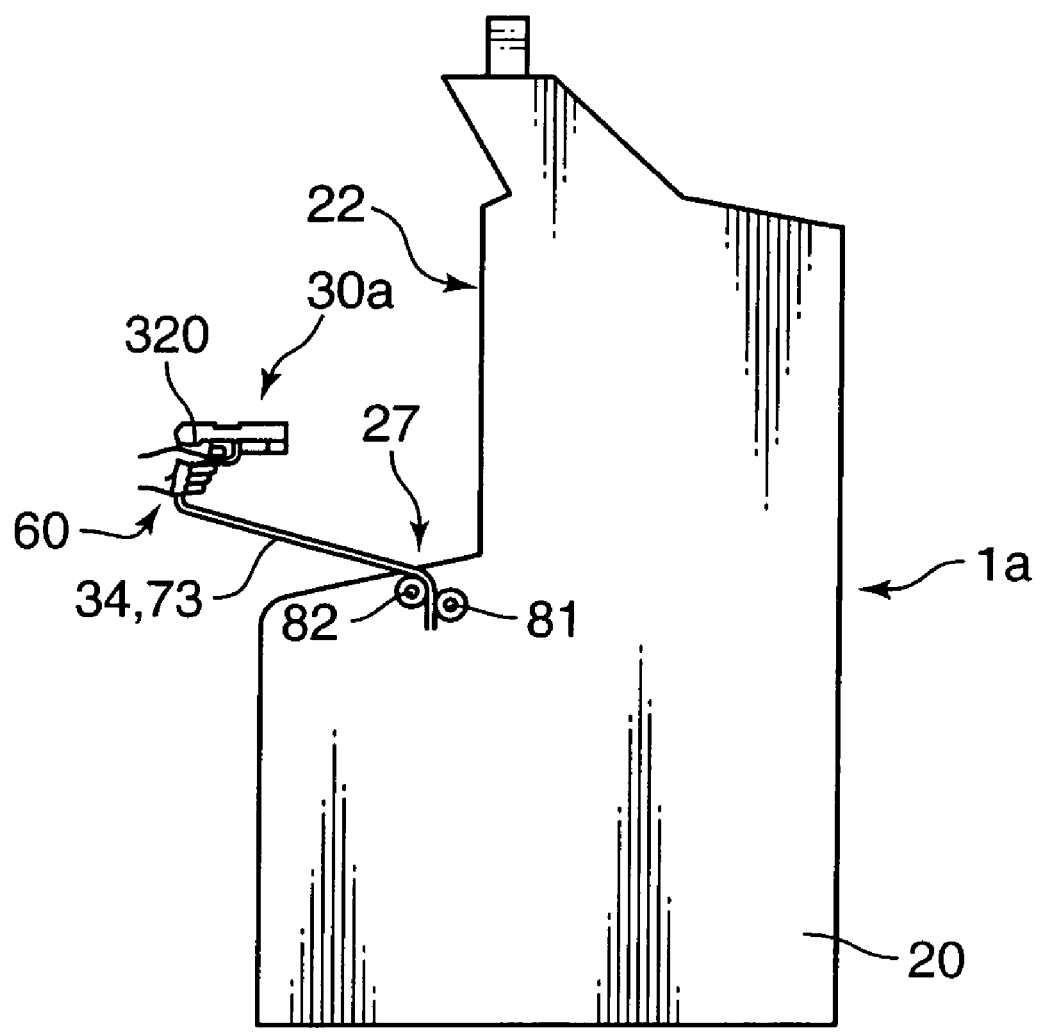
FIG. 11 is a schematic side sectional view of the shooting game machine shown in FIG. 9.

Further, the rollers 81, 82, as shown in a schematic side sectional view of the shooting game machine 1a in FIG. 11, are arranged so as to be serial in forward and backward directions of the casing 20, and its side in a withdrawing direction of the signal cable 34 becomes a predetermined height higher. Namely, the rollers 81, 82 are arranged so that the signal cable 34 is bent toward a front side so as to be rolled at a midstream position 623 on the roller 82.

Consequently, since the unified cable is nipped and retained movably by the pair of rollers 81, 82 at a position lower than the main body 320 in use for play and in a forward area of the handle portion 32 of the main body 320 in a direction facing the muzzle, a drive force with respect to the main body 320 is imparted from a lower front side, namely, from a lower side in a direction of the screen (monitor portion 22) of the shooting game machine 1a. Further, due to a tractive force applied from an obliquely lower side with respect to the main body 320, a rotational movement toward a player side about the handle portion 32 as a supporting point is generated with respect to the main body 320 handled by a player. Consequently, the muzzle is raised assuredly.

Further, since the unified cable is nipped between the rollers 81, 82 which are parallel to a floor surface, a tension of the core 71 (transmitter 70) connected to the connecting member 61 i.e. an upper end portion (a portion exposed from the outer member 72) in an interval (interval V) indicated by the reference character V can be retained in a state of being substantially tensed by using a force of own weight of the retaining member 62 (including weight of the signal cable 34, the outer member 72 and the core 71) in a downward direction indicated by an arrow U.

Consequently, the state where the drive force transmitting cable 73 (core 71) is loosened and a drive force generated in the drive force generator 41 is not transmitted to the connecting portion 61 can be prevented. Namely, even if the base portion 712 of the core 71 is moved a predetermined distance with respect to the outer member 72, it can be prevented that the movement in the predetermined distance is absorbed by loosening in the interval V (used for stretching the loosened core 71) and a mechanical movement of is not transmitted to the connecting member 61. Accordingly, a movement of the core 71 with respect to the outer member 72 is assuredly performed so that a reactionary force (impact force) is assuredly imparted to the main body 320.

Since the unified cable is so controlled as to be nipped by the rotatably supported rollers 81, 82, the unified cable can be freely drawn and pushed back in a direction indicated by an arrow R easily (a nipping position of the unified cable by the rollers 81, 82 can be changed easily). Namely, a distance between positions of the main body 320 and the leading out opening 27 (refer to FIG. 9) can be desirably changed so that a position where a player holds the main body 320 can be moved.

Similarly to the main body 310, the main body 320 includes a light receiving device 35, a trigger switch 333 and a switch 335. When the trigger 332 is squeezed, the trigger switch 333 is turned on. Accordingly, an infrared light ray is irradiated from a light emitting device 311 in the light receiving device 35, and a drive force generator 41 is driven to generate a reactionary force with respect to the main body 320.

Figure 12:
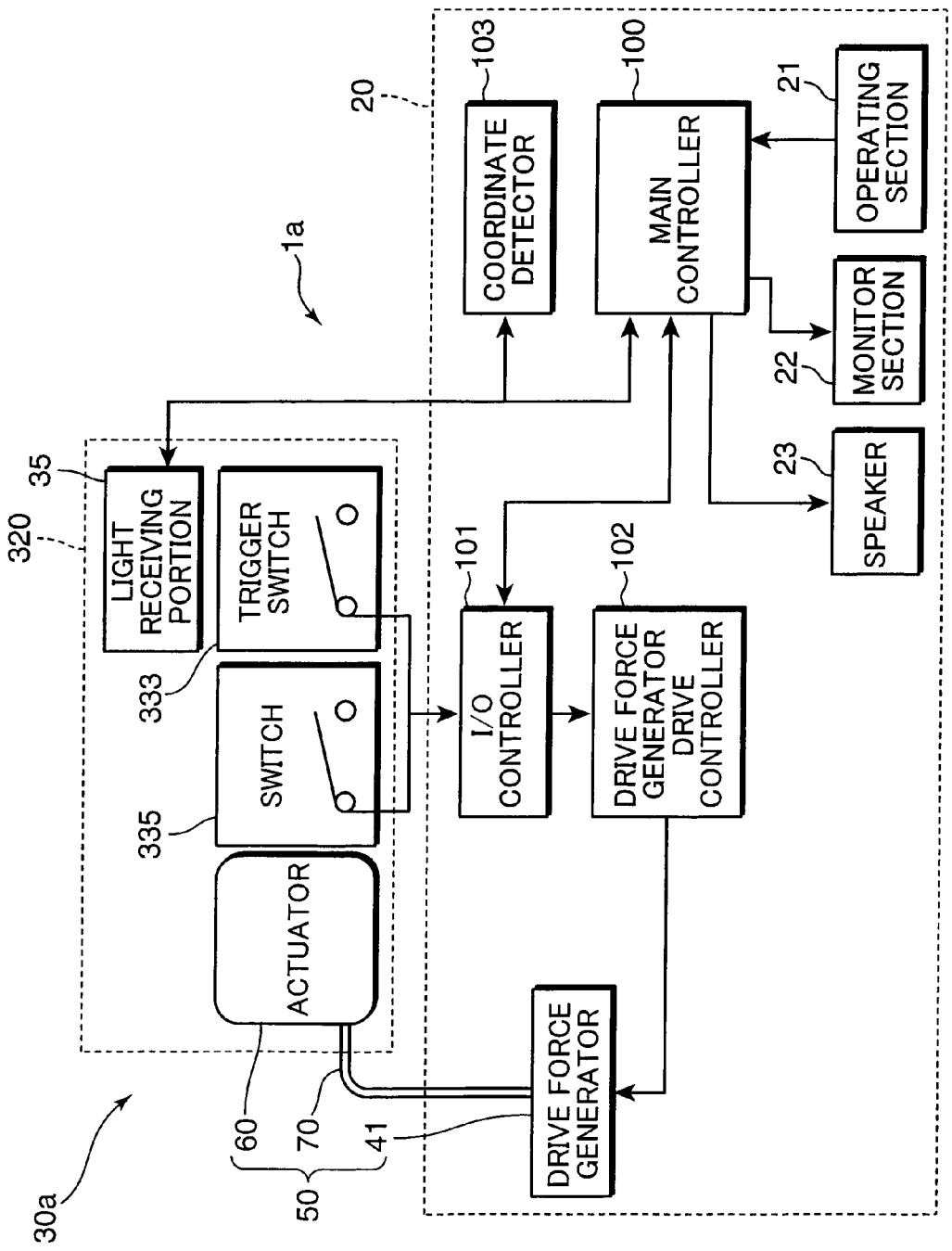
FIG. 12 is a block diagram mainly showing a control system relating to a shooting operation of the simulated gun of the shooting game machine shown in FIG. 9.

FIG. 12 is a block diagram mainly showing a control system relating to a shooting operation of the simulated gun 30a of the shooting game machine 1a shown in FIG. 9. A construction of the control system relating to a shooting operation of the simulated gun 30a of the shooting game machine 1a other than a mechanical construction of the main body 320 and the reactionary force generator 50 (electric construction) is the same as that of the shooting game machine 1. Accordingly, description is abbreviated.

Figure 13:
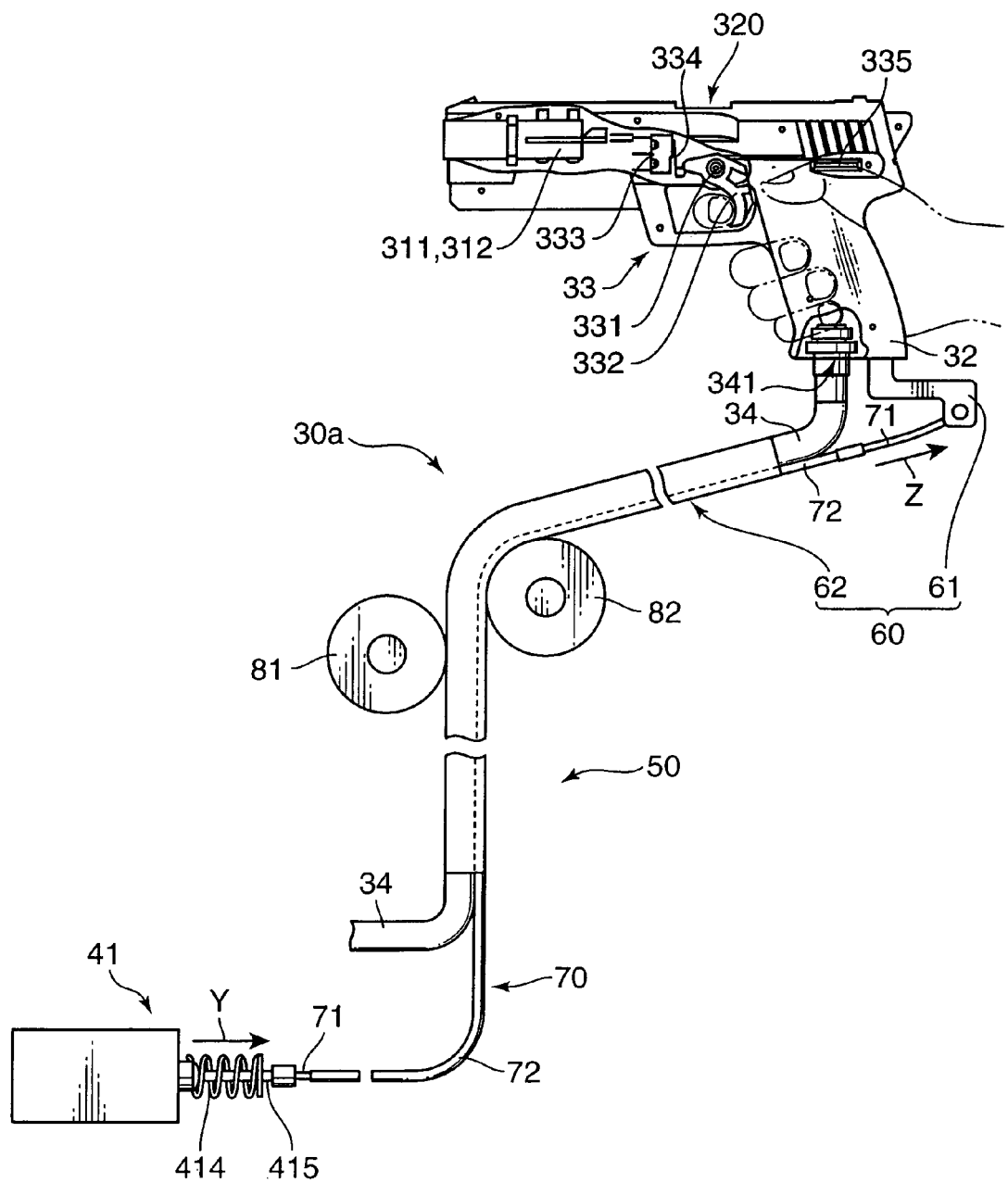
FIG. 13 is a view for describing a movement of an internal structure at the time when the main body of the simulated gun shown in FIG. 10 is handled by a player and a trigger thereof is squeezed.
Figure 14:
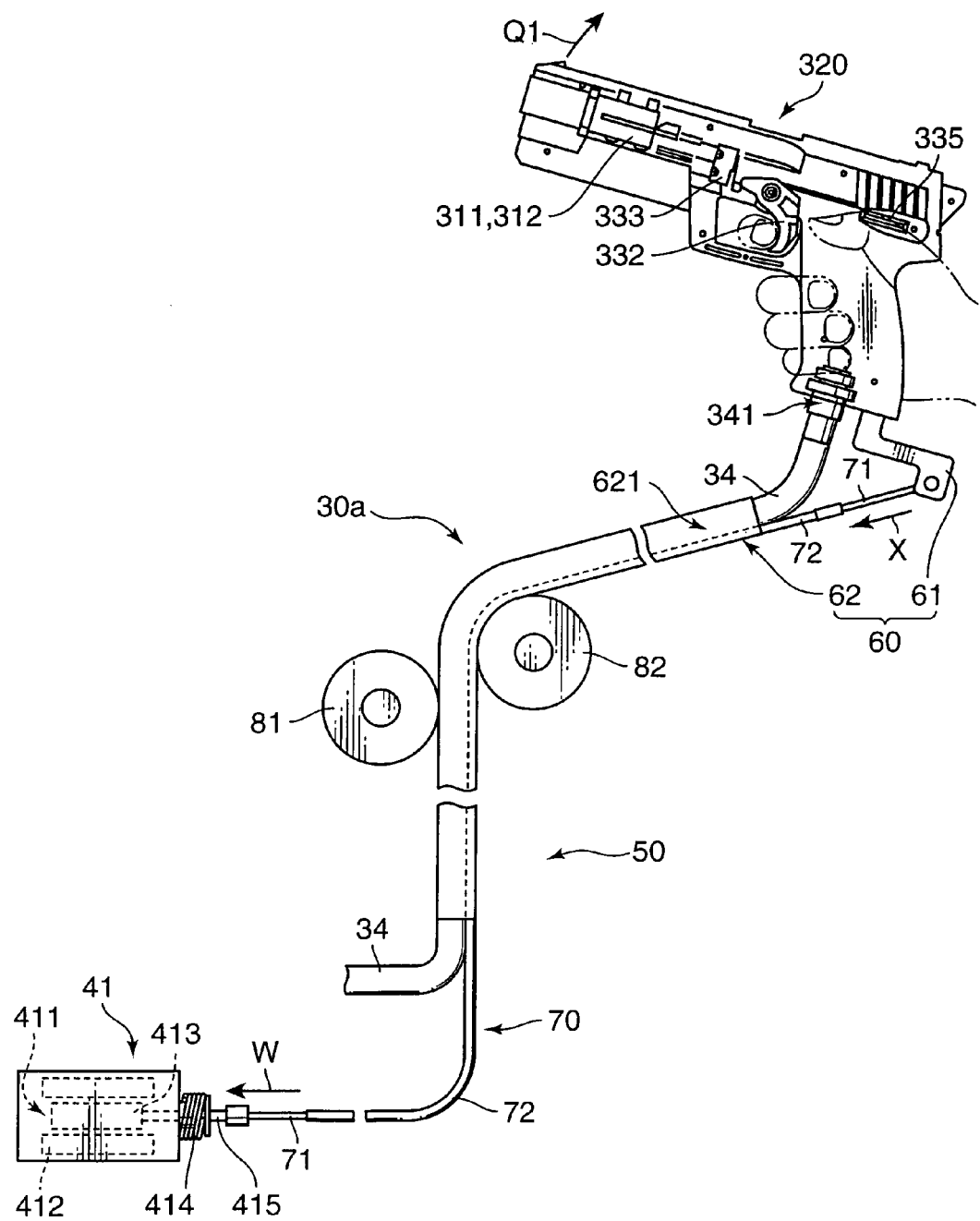
FIG. 14 is a view showing a state where a reactionary force is applied to the main body of the simulated gun shown in FIG. 13.

Hereinafter, a shooting operation of the simulated gun 30a is described with reference to FIGS. 10, 12 and 13, 14. FIG. 13 is a view for describing a movement of an internal structure at the time when the main body 320 of the simulated gun is handled by a player and the trigger 332 is squeezed. FIG. 14 is a view showing a state where the drive force generator 41 is driven and a reactionary force is imparted to the main body 320.

Assuming that a single shooting mode is selected in the switch 335, as shown in FIG. 13, if the trigger 331 is squeezed by a player so that the trigger 331 is rotated about the trigger 331 as a supporting point, a leading end portion of the trigger 332 comes in contact with amovable piece 334 so that orientation of the movable piece 334 is changed. Accordingly, the trigger switch 333 is turned on. When the trigger switch 333 is turned on, a trigger signal is inputted to the main controller 100 through the signal cable 34. Based on the input, the main controller 100 controls the drive force generator drive controller 102 to output a signal to drive the drive force generator 41.

Then, as shown in FIG. 14, the drive force generator drive controller 102 supplies a pulse electric current to the electromagnetic coil portion 412 of the drive force generator 41. The plunger 413 is moved in an inserting direction toward a casing of the electromagnetic solenoid 411 while resisting against a biasing force generated by the spring 414, and the core 71 is moved a predetermined distance in a direction indicated by an arrow W with respect to the outer member 72. Accordingly, the connecting member 61 connected to the core 71 is pulled a predetermined distance in a direction indicated by an arrow X. Since the outer member 72 is retained unifyingly with the signal cable 43 by the retaining member 61 at least in a vicinity of an upper end position 621, a force urging a muzzle of the barrel portion 31 to move toward a side opposite to the trigger 332 (trigger 33) side with respect to the barrel portion 31 (a reactionary force in the present invention) is applied with respect to the main body 320. For example, in FIG. 14, a rotationary force (an impact force) urging the muzzle portion to rotate in a direction indicated by an arrow Q1 about a connecting portion 341 as a rotational supporting point between the main body 320 and the signal cable 34 is applied. Accordingly, a player can experience a realistic reactionary force which springs up the muzzle portion. In such case, the spring 414 of the drive force generator is in a contracted state.

Next, when a supply of a pulse electric current to the magnetic coil portion 412 is terminated in FIG. 14, as shown in FIG. 13, the plunger 413 is moved in a projecting direction due to a biasing force generated in the spring 414 and the core 431 moves reversely a predetermined distance (moves back to an initial position) in a direction indicated by an arrow Y with respect to the outer member 72. Then, due to the connecting member 61 moved back a predetermined distance in a direction indicated by the arrow Z, a rotational force urging the muzzle portion to move in a direction opposite to the direction indicated by an arrow Q1 about the connecting portion 341 is applied to the main body 320.

Thereafter, as shown in FIG. 10, the trigger 332 is moved back to an initial position, and the trigger switch 333 is turned off. Similarly to the main body 310, a moving back operation of the trigger 332 may be performed independently from an operation to pull back the connecting member 61 with the drive force generator 41 (core 71). In the case of performing next shooting, the states shown in FIGS. 13, 14 and 10 are repeated.

In the case where the successive shooting mode is selected in the switch 335, a periodical supply of pulse electric current to the electromagnetic coil portion 412 is repeated during when the trigger switch 333 is turned on after the trigger 332 is squeezed. Accordingly, an operation of pulling and pushing the connecting member 61 is repeated so that impact force is successively applied to the main body 320. Consequently, a successive reactionary force (a reactionary force of a machine gun shooting) is imparted to the main body 320.

Consequently, according to the simulated gun 30 (30a) of the present invention, the drive force generator 41 is arranged outside the main body 310 (320). The transmitter 43 (70) connecting the drive force generator 41 and the actuator 42 (60) transmits a drive force generated in the drive force generator 41 to the actuator 42 (60) provided in a specified portion of the main body 310 (320). The actuator 42 (60) to which a drive force is applied imparts to the main body 310 (320) a force urging a muzzle of the barrel portion 31 to move toward a side opposite to a side of the trigger 332 with respect to the barrel portion 31. A drive force generated in the drive force generator 41 is transmitted to the actuator 42 (60) through the transmitter 43 (70), and the actuator 42 (60) which receives a drive force imparts to the main body 310 (320) a force toward a direction of raising the muzzle. Since a reactionary force following a virtual shooting is generated by the construction described above, the drive force generator 41 is arranged outside the main body 310 (320) so that the main body 310 (320) can be reduced in size and a required drive force can be generated by a power of the drive force generator 41. Accordingly, a rotation toward a direction of raising the muzzle, namely, a realistic reactionary force of springing up the muzzle of the main body 310 (320) at the time of virtual shooting can be realized.

Further, the transmitter 43 (70) includes the slender core 431 (71) and the outer member 432 (72) freely enclosing the core 431 (71) and restricting a movement of a leading end of the core 431 (71) in a longitudinal direction with respect to the main body 310 (320), and the core 431 (71) is moved a predetermined distance in a longitudinal direction with respect to the outer member 432 (72) by the drive force generator 41 so that the mechanical moving operation is transmitted to the actuator 42 (6). Accordingly, a construction that a drive force generated in the drive force generator 41 is assuredly transmitted to the actuator 42 (60) through the transmitter 43 (70) can be realized with a simple construction.

Since the core 431 (71) is long and slender, a drive force generated in the drive force generator 41 can be transmitted to the main body 310 (320) located at a position apart from the drive force generator 41 and oriented toward a desirable direction. Further, since the slender core 431 (71) directly transmits a drive force from the drive force generator to the main body 310 (320), various reactionary force operations, namely, a single shooting or successive shooting and strength of a reactionary force of shooting can be accurately reflected in the main body 310 (320).

Further, the actuator 42 includes the hitting portion 424 stored movably between a separating position (the open position 301 of the space 300) from and a contacting position (contacting position 302) with an inner wall surface of the main body 310. A leading end of the core 431 is attached to the hitting portion 424, and a leading end of the outer member 432 is attached to the main body 310 (handle portion 32). The hitting portion 424 receives a drive force and moves from the open position 301 to the contacting position 302. Accordingly, since the hitting portion 424 receives a drive force due to a mechanical movement by the core 431 with respect to the outer member 432 and moves from the open position 301 to the contacting position 302 of the inner wall surface to collide therewith in the main body 310, a construction of imparting a reactionary force to move a muzzle of the main body in a direction of lifting up can be realized with a simple construction.

The hitting portion 424 includes the rotational arm 422, the weight 423 and the horizontal shaft 421. The transmitter 43 is connected to one end side of the rotational arm 422. On the other end side of the rotational arm 422, the weight 423 is provided. The horizontal shaft 421 is provided in the main body 310 and axially supports the rotational arm 422 at an intermediate portion thereof so as to enable the weight 423 to move between the open position 301 and the contacting position 302. As described above, since the hitting portion 424 receives by the rotational arm 422 a drive force transmitted from the transmitter 43 and rotates (moves) between the open position 301 and the contacting position 302 with the weight 423 about the horizontal shaft 421 as a center, a force toward a direction of raising the muzzle can be easily applied with respect to the main body 310 with use of a rotation of the rotational arm 422 and the weight 423 about the horizontal shaft 421.

Further, since the hitting portion 424 is positioned in a rear portion of the barrel portion 31 in the main body 310, the hitting portion 424 hits the main body 310 from inner portion of the main body 310 at a rear position of the barrel portion 31. Accordingly, a feeling of impact transmitted from an inner portion of the main body 310 can be obtained and more realistic reactionary force can be obtained. Furthermore, the hitting portion 424 reduced in size can be provided in the main body 310, the main body 310 being good in operability and appearance can be provided.

Further, at a specified outer portion of the main body 320, the signal cable 34 is connected for sending and receiving an electric signal. The actuator 60 includes the connecting member 61 provided at a specified outer portion of the main body 320 and apart from the muzzle with respect to the attachment position 341 of the signal cable 34 for connecting the core 71 and the retaining member 62 substantially unifying the outer member 72 and the signal cable 34. As described above, the retaining member 62 substantially unifies the outer member 72 and the signal cable 34, and the connecting member 61 connects the main body 320 and the core 71 at a position apart from the muzzle with respect to the attaching position 341 of the signal cable 34 and the main body 320 at a specified portion of the main body 320. Accordingly, a drive force in accordance with a mechanical movement of the core 71 with respect to the core 72 is imparted to an outer portion of the main body 320 so that a reactionary force of rotating the muzzle in a direction lifting the muzzle with respect to the main body 320 can be imparted. Further, since the outer member 72 is unified with respect to the signal cable 34, a shape of the core 71 being in a movement of the outer member can be retained strongly and assuredly.

Further, the signal cable 34 is used to unify (bundle) the outer member and the exterior cable. Accordingly, the state of attaching the core 71 to the connecting member 61 without loosening can be easily obtained so that a drive force generated in the drive force generator 41 can be transmitted to the main body 320 assuredly through the core 71.

Further, the connecting position 341 of the signal cable 34 with respect to the main body 320 and the attachment position 611 of the connecting member 61 are in a lower end of a handle portion 32. Accordingly, the main body 320 may be so constructed as to impart a reactionary force to rotate the muzzle of the main body 320 in a direction of lifting up with a simple construction while maintaining an appearance which is close to a real gun.

Further, the pair of rollers 81, 82 (guide members) movably nip the exterior cable 34 and the outer member 72 unified by the retaining member 62 (unified cable) in a position lower than the main body 320 in use for play and in a forward area of the handle portion 32 of the main body 320 in a direction facing the muzzle. Accordingly, a drive force with respect to the main body 320 is applied from a lower forward portion toward the main body 320. For example, a drive force is applied from a lower side of the screen. A towing force with respect to the main body 320 is applied to the main body 320 from a lower oblique direction, a movement of rotating the main body 320 handled by a player toward a side of a player (backward) with a supporting point of the handle portion 32. Consequently, the muzzle is assuredly lifted upward.

Further, the unified signal cable 34 and the outer member 72 are nipped between two rollers 81, 82 parallel to a floor surface. Accordingly, the state of tensing the core member 71 connected to the connecting member 61 by using a pulling generated by a weight of a retaining member 62 in apposition lower than a position nipped by the rollers 81, 82 can be easily obtained. Consequently, a movement of the core 71 with respect to the outer member 72 can be performed assuredly.

Further, the drive force generator 41 is constructed by the electromagnetic solenoid 411 which drives the plunger 413 connected to a base end of the core 431 (71) of the transmitter 43 (70) in a recessing direction. Accordingly, the drive force generator 41 can be realized with a simple construction. The present invention may take the following embodiments.

(A) The main body of a gun of the shooting game machine 1, 1*a* is not limited to a shape of the main body 310 (320) but may have, for example, a shape of revolving gun or a shape of a machine gun. Further, the main body 310 (320) may be so constructed as not to have the switch 335.

(B) A form of the trigger in the main body 310 (320) does not have to be in a form of being rotated about a predetermined shaft (horizontal shaft 331) like the trigger 332 to perform a squeezing operation but may be in a form of sliding in forward and backward directions to perform the squeezing operation. In this case, the trigger switch may also be switched between states of ON and OFF in accordance with a movement of the trigger 332 slidely.

(C) A collision preventing member (so-called stopper) for preventing a front portion of the hitting portion 424 (when the hitting portion is rotated in a rotational direction indicated by an arrow B1 and came back to a normal position) from being directly colliding with an inner wall surface of the main body 310 may be provided.

(D) The signal cable 34 may take various kinds of forms as long as the signal line is wired and the gun main body 310 (320) can be movably supported. For example, it may be the one constructed only by a harness which does not include a protection cable.

(E) The main body 310 (320) does not have to be supported only by the signal cable 34 does not have to be as shown in FIGS. 1 and 9, but a plat form or a supporting body (supporting rod, for example) for placing each simulated gun in a form of pillowing or latching may be provided. In this case, the signal cable 34 may be so constructed to have a high plasticity (more flexibility) to raise operability in moving the main body 310 (320) by a player.

(F) The retaining member 62 does not have to be a tube but may be the one winded by a predetermined tape. Further, the retaining member 62 does not have to be constructed by one tube but may be constructed by multiples of tubes. For example, it may be the one constructed by three tube portions respectively located in a vicinity of an upper end position 621, a vicinity of a midstream position 623 nipped by the rollers 81, 82 and a lower end position 622.

(G) In the shooting game machine 1 shown in FIG. 1, the signal cable 34 and the transmitter 43 does not have to be trailed separately but may be unified by the tube (retaining member 62) or a tape so that the signal cable 34 and the transmitter 43 are not separated apart. Further a supporting construction using the rollers 81, 82 as shown in the shooting game machine 1a can be adapted to the signal cable 34 of the shooting game machine 1.

(H) The signal cable 34 (unified cable) does not have to be nipped by the two rollers 81, 82 as shown in FIGS. 10 and 11 but may be nipped by more than three rollers (or more than two pairs). Further, a position of each roller is not limited to the one indicated in FIGS. 10 and 11 but may be positioned in a horizontal direction while being aligned without vertical dislocation. Further, the rollers 81, 82 do not have to be positioned in forward and backward directions (serially) but may be positioned in leftward and rightward directions or in oblique direction. Further, it does not have to take a form of being nipped by rollers but may have a construction of being nipped by multiples of ball bodies arranged in a periphery of the unified cable.

(I) A pump (driving device in a pumping manner) may be adapted to the drive force generator 41. In this case, a circuit system for transmitting a pressure may be adapted to the transmitter 43 (70).

As described above, a simulated gun according to the present invention is a simulated gun capable of generating a reactionary force urging a muzzle of a barrel to move toward a side opposite to a trigger side with respect to the barrel following a virtual shooting in a shooting game, comprising: a main body; an actuator provided in a specified portion of the main body for generating the reactionary force tendency to move the muzzle; a drive force generator arranged outside the main body; and a transmitter connecting the drive force generator and the actuator for transmitting a drive force generated in the drive force generator to the actuator.

According to this construction, a drive force generated in the drive force generator is transmitted to the actuator provided in the main body through the transmitter. When the actuator receives a transmitted drive force, it applies to the main body a force urging the muzzle of the barrel to move toward a side opposite to the trigger side with respect to the barrel. Accordingly, a reactionary force at the time of virtual shooting is generated.

Therefore, since the drive force generator is arranged outside the main body, the main body becomes smaller in size and weight and also a required great drive force can be generated in accordance with a power of the drive force generator. Accordingly, a simulated gun obtaining a rotation in a direction to move the muzzle of the barrel toward a side opposite to the trigger side with respect to the barrel i.e. a realistic reactionary force of hopping up the muzzle side of the main body at the time of virtual shooting can be realized.

Further, it is preferable that the transmitter includes: a slender core having an one end connected to the actuator; and a tubular outer member enclosing the core member freely therein, and having a leading end placed in the main body immovably in a longitudinal direction thereof, and the drive force generator imparts the slender core a drive force to move the other end of the slender core a predetermined distance in a longitudinal direction against the tubular outer member.

In the case where the transmitter is not provided with the outer member but is constructed only by the core member, even if a drive force is applied to a base end of the core (pulls a base end of the core), a drive force just absorbs loosening in a midstream of the core and not transmitted to the actuator of the main body. Since the present invention assumes a shooting game having a main body not fixed on a pedestal but retaining freedom of allowing a user to handle and move in any directions, as can be seen that it is limited to construct the core to be long and slender.

According to the construction described above, a passage of the core is fixed by the outer member freely enclosing the core. Accordingly, in the case where the other end of the core is pulled by the drive force generator, the condition where a loosening in a midstream of the core is just extended and a drive force is not transmitted to a leading end can be avoided. While being in the state where a shape of the loosened portion is retained, a drive force is transmitted to the leading end, namely, a drive force can be assuredly transmitted to the main body. Thus, a drive force generated in the drive force generator is applied to the other end of the core so that the core is moved a predetermined distance in a longitudinal direction with respect to the outer cover so that this mechanical moving operation is transmitted to the actuator.

As described above, the transmitter includes the core and the outer member, and the core is moved a predetermined distance in a longitudinal direction with respect to the outer member so that the mechanical moving operation is transmitted to the actuator. Accordingly, a construction that a drive force generated in the drive force generator is assuredly transmitted to the actuator through the transmitter can be realized with a simple construction. Further, since the core is formed to be long and slender, a drive force generated in the drive force generator can be transmitted to the main body oriented in a desirable direction at a position apart from the drive force generator. Further, since a drive force is directly transmitted to the main body from the drive force generator through the core, various reactionary force operations i.e. a single shooting or successive shooting, or strength of a reactionary force of shooting can be accurately reflected in the main body.

Further, it is preferable that the actuator includes a hitting portion movable between a separating position from and a contacting position with an inner wall surface of the main body, the one end of the slender core is connected to the hitting portion and the leading end of the outer member is attached to the main body, and the hitting portion receives the drive force to thereby move from the separating position to the contacting position with respect to the inner wall surface of the main body.

According to the construction, the hitting portion receives the drive force in accordance with a mechanical movement of the core with respect to the outer member and moves from the separating position from and contacting position with respect to the inner wall surface of the main body and collides thereto.

As described above, the hitting portion receives the drive force and moves from the separating position to the contacting position with respect to the wall surface of the main body and collides at the contacting position. Accordingly, a construction in which a reactionary force of rotating the main body in a direction lifting up the muzzle is applied can be easily realized with a simple construction.

Further, it is preferable that the hitting portion includes: an arm having an end connected to the transmitter; a weight provided on the other end of the arm; and a supporting shaft for supporting the arm at an intermediate portion in such a way that the weight pivotally moves between the separating position from the inner wall surface of the main body and the contacting position with the inner wall surface of the main body.

According to this construction, the hitting portion receives a drive force through the arm and is pivotally moved with the weight about the supporting shaft between the separating position from the inner wall surface of the main body and the contacting position with the inner wall surface of the main body. Accordingly, using a rotation about the arm and shaft, a force toward a direction of lifting up the muzzle with respect to the main body can be easily obtained.

Further, it is preferable that the hitting portion is provided in a rear portion of the barrel.

According to this construction, the hitting portion hits the main body from a rear portion of the barrel in the main body. An impact force generated following the hitting of the hitting portion is generated in a rear portion of the barrel. However, since the handle portion is handled by a player during a play and is firmly fixed, a movement of rotating the barrel according to the generated impact force about a vicinity of the connecting portion between the handle portion handled by a player and the barrel can be efficiently generated. Consequently, the muzzle is lifted upward with great force.

Accordingly, a player obtains a feeling that an impact force is transmitted from an inner portion of the main body, and a more realistic reactionary force can be obtained. Further, since the downsized hitting portion may be provided in the main body, the main body which is good in operability and having a good appearance can be provided.

Further, it is preferable that the main body is attached with an exterior cable at a specified outer portion of the main body for sending and receiving an electric signal and that the actuator includes: a connecting member attached at a specified outer portion of the main body and further apart from the muzzle than the exterior cable, and connected with the slender core; and a retaining member for substantially unifying the outer member and the exterior cable.

According to this construction, the retaining member substantially unifies the outer member and the exterior cable, and the connecting member connects the main body and the core at a specified outer portion of the main body and further apart from the muzzle than the exterior cable so as to impart to an outer portion of the main body a drive force following a mechanical movement of the core with respect to the outer member. Further, as described above, since it is so constructed that a drive force is applied with respect to the outer portion of the main body i.e. a whole portions of the main body, it is required to make a fixing of shape of the outer member stronger as compared to the construction of claim 1. To make the fixing of shape of the outer member strong, the outer member itself may be formed to have a thickness to be strong. However, since there already exists an outer cable for sending and receiving an electric signal which is a fundamental construction of the gun (main body) used in this kind of shooting game and the outer cable has some extent of strength, the outer cable is effectively utilized in this claim.

Accordingly, without providing all of the construction for generating a reactionary force with respect to the main body, a reactionary force of making the main body rotated in a direction of lifting up the muzzle can be imparted with respect to the main body. Further, since the outer member is unified with respect to the outer cable, retaining of a shape at the time when the core moves, which is an object of the outer member, can be made stronger and assured. Further, even in the case of providing a drive force to a whole main body, the exterior is used, namely the outer member and the exterior cable are unified to be fixed. Accordingly, the state of connecting the core to the attachment position without loosening it can be obtained easily, and the drive force generated in the drive force generator can be transmitted to the main body assuredly through the core.

Further, it is preferable that the exterior cable attachment position and the connecting member attachment position are in a lower end of the handle portion of the main body.

According to this construction, the connecting member is attached to the handle portion of the main body and is connected to the exterior cable. Namely, since the exterior cable attachment position and the connecting member attachment position are in the handle portion (in a lower end position of the handle potion) of the main body, a construction in which a reactionary force of rotating the muzzle in a direction lifting up with respect to the main body can be realized with a simple construction while the main body is maintained to have a good appearance.

Further, it is preferable that the simulated gun further comprises a guide member for nipping the exterior cable and the outer member unified by the retaining member movably, wherein the guide member is provided in a position lower than the main body in use for play and in a forward area of the handle portion of the main body in a direction facing the muzzle.

According to this construction, the guide member movably nips the exterior cable and the outer member unified by the retaining member in a position lower than the main body in use for play and in a forward area of the handle portion of the main body in a direction facing the muzzle.

As described above, since the outer member unified by the retaining member and the exterior cable are movably nipped to hold in a position lower than the main body in use for play and in a forward area of the handle portion of the main body in a direction facing the muzzle, a drive force with respect to the main body from a lower front side is applied. For example, in the shooting game and the like, a drive force is applied from a lower side in a direction of screen. Then, a tractive force is applied from an oblique downward direction is applied with respect to the main body so that a drive force of rotating the handle portion handled by the player is generated. Consequently, the muzzle can be assuredly lifted upward.

Further, it is preferable that the guide member is a pair of rollers supported by shafts parallel to a floor surface.

According to this construction, two rollers parallel to a floor surface nip the exterior cable and the outer member unified by the retaining member therebetween. As described above, since the unified exterior cable and outer member are nipped between two rollers parallel to a floor surface, a weight of the retaining member at a portion lower than a position between the rollers (including weight of the exterior cable, outer member and the core) is used so as to easily obtain a tensed state of the core (transmitter) attached to the connecting member. Accordingly, a movement of the core with respect to the outer member can be performed assuredly.

Further, it is preferable that the drive force generator includes: an electromagnetic solenoid for driving a plunger connected to the other end of the slender core of the transmitter in an insertion direction; and a biasing member for imparting a force of urging the plunger in an outward direction.

According to this construction, when the electromagnetic solenoid is magnetized and the plunger is driven in an insertion direction, the core generates a drive force in accordance with a mechanical movement toward the plunger. On the other hand, when the electromagnetic solenoid is demagnetized, the plunger moves back to an initial position in an outward direction by the biasing member. Accordingly, the drive force generator can be realized with a simple construction including the electromagnetic solenoid and the biasing member.

It should be noted that items described as means for accomplishing some kind of function in the specification of the present application is not limited to the construction described in the specification for accomplishing the functions but includes constructions of a unit, part and the like for accomplishing the function.

The invention claimed is:

1. A simulated gun capable of generating a reactionary force tendency to move a muzzle of a barrel toward a side opposite to a trigger side with respect to the barrel following a virtual shooting in a shooting game, comprising:
   a gun main body;
   an actuator provided in a specified portion of the main body for generating a reactionary force tendency to move the muzzle;
   a drive force generator arranged outside the main body at a game machine having a target for said virtual shooting; and
   a transmitter connecting the drive force generator and the actuator for transmitting force generated in the drive force generator to the actuator;
   wherein the transmitter includes
   a slender core having one end connected to the actuator, and
   a tubular outer member having a channel defined to enclose only the slender core and allow the slender core to move freely therein along a length of the channel, the tubular member having a leading end placed in the main body immovably in a longitudinal direction thereof and having an opposite end fixed to a game machine with which the simulated gun is used to play said shooting game,
   wherein the drive force generator imparts a drive force to the slender core to move an other end of the slender core a predetermined distance in a longitudinal direction in to the tubular outer member toward the game machine, said slender core freely moving longitudinally within the outer tube member as said other end moves; and
   wherein the actuator includes a hitting portion movable between a separating position from and a contacting position with an inner wall of the main body,
   the one end of the slender core is connected to the hitting portion and the leading end of the tubular outer member is attached to gun main body, and
   the hitting portion receives the drive force to thereby move from the separating position to the contacting position with respect to the inner wall surface of the main body.

2. A simulated gun according to claim 1, wherein:
   the hitting portion includes:
   a rotational arm having an end connected to the transmitter;
   a weight provided on the other end of the arm; and
   a supporting shaft defining an axis of rotation of the arm, the shaft for supporting the arm at an intermediate portion in such a way that the weight pivotally moves between the separating position from the inner wall surface of the main body and the contacting position with the inner wall surface of the main body as the arm rotates in response to said actuation of the actuator;
   wherein said moving of the weight toward the contacting position is in a direction away from the muzzle front end so that contact with said inner wall generates said reactionary force tendency to move the muzzle front end upward.

3. A simulated gun according to claim 1, wherein the hitting portion is provided in a rear portion of the barrel.

4. A simulated gun according to claim 1, wherein:
   the main body is attached with an exterior cable at a specified outer portion of the main body for sending and receiving, an electric signal, and
   the actuator includes:
   a connecting member attached at a specified outer portion of the main body and further apart from the muzzle than the exterior cable, and connected with the slender core; and
   a retaining member for substantially unifying the tubular outer member and the exterior cable.

5. A simulated gun according to claim 4, wherein the exterior cable attachment position and the connecting member attachment position are in a lower end of a handle portion of the main body.

6. A simulated gun according to claim 4, further comprising a guide member for nipping the exterior cable and the tubular outer member unified by the retaining member movably,
   wherein the guide member is provided in a position lower than the main body in use for play and in a forward area of the handle portion of the main body in a direction facing the muzzle.

7. A simulated gun according to claim 6, wherein the guide member includes a pair of rollers supported by shafts parallel to a floor surface.

8. A simulated gun according to claim 1, wherein the drive force generator includes:
   an electromagnetic solenoid for driving a plunger connected to the other end of the slender core of the transmitter in an insertion direction; and
   a biasing member for imparting a force of urging the plunger in an outward direction.

9. A simulated gun capable of generating a reactionary force tendency to move a muzzle of a barrel upward and toward a side opposite to a trigger side with respect to the barrel following a virtual shooting in a shooting game, comprising:

a main body;
an actuator provided in a specified portion of the main body for generating in response to actuation a reactionary force tendency to move a front end of the muzzle upward, the actuator including a hitting portion movable during said actuation between a separating position from and a contacting position with an inner wall of the main body, wherein said moving toward the contacting position is in a direction away from the muzzle front end so that contact with said inner wall generates said reactionary force tendency to move the muzzle front end upward;
a drive force generator arranged outside the main body; and
a transmitter connecting the drive force generator and the actuator for transmitting force generated in the drive force generator to the actuator to cause said actuation;
wherein the transmitter includes
　a slender core having one end connected to the actuator hitting portion, and
　a tubular outer member enclosing the core member freely therein, and having a leading end attached to the main body, and
wherein the drive force generator imparts a drive force to the slender core to move an other end of the slender core a predetermined distance in a longitudinal direction relative to the tubular outer member, the hitting portion receiving the drive force during said actuation to thereby move from the separating position to the contacting position with respect to the inner wall surface of the main body; and
wherein the actuator hitting portion comprises:
a rotational arm having an end connected to the transmitter;
a weight provided on the other end of the arm; and
a supporting shaft defining an axis of rotation of the arm, the shaft for supporting the arm at an intermediate portion in such a way that the weight pivotally moves between the separating position from the inner wall surface of the main body and the contacting position with the inner wall surface of the main body as the arm rotates in response to said actuation of the actuator;
wherein said axis and said weight contacting position are relatively located so that upon said actuation the reactionary force, which is responsive to the weight striking said inner wall surface, tends to move the muzzle front end upward.

10. A simulated gun capable of generating a reactionary force tendency to move a muzzle of a barrel upward and toward a side opposite to a trigger side with respect to the barrel following a virtual shooting in a shooting game, comprising:
a gun main body;
an actuator having a hitting portion provided inside the main body for moving upon actuation from a position out of contact with an inner wall surface of the main body to a position in contact with said inner wall surface, wherein said moving toward the contact position is in a direction away from the muzzle front end so that contact with said inner wall surface generates said reactionary force tendency to move the muzzle front end upward;
a drive force generator arranged outside the main body; and
a transmitter connecting the drive force generator and the actuator for transmitting force generated in the drive force generator to the actuator causing said actuation;
wherein the transmitter includes
a slender core having one end connected to the actuator, and
a tubular outer member enclosing the slender core which is movable freely therein, the tubular outer member having a leading end fixed relative to the main body, and
wherein the drive force generator imparts a drive force to the slender core to move the slender core relative to the surrounding tubular outer member a predetermined distance in a longitudinal direction, the movement of the slender core moving the actuator inside the main body to move from a position out of contact with an inner wall surface of the main body to a position in contact with said inner wall surface, said actuator motion generating said reactionary force causing said muzzle front end to move upward.

* * * * *